(12) United States Patent
Donnelly

(10) Patent No.: US 11,679,790 B2
(45) Date of Patent: Jun. 20, 2023

(54) MOTORIZED RAIL CAR

(71) Applicant: RHD Rail Haul Technologies Corp., North Vancouver (CA)

(72) Inventor: Frank Wegner Donnelly, North Vancouver (CA)

(73) Assignee: RHT Rail Haul Technologies Corp., North Vancouver (CA)

( * ) Notice: Subject to any disclaimer, the term of this patent is extended or adjusted under 35 U.S.C. 154(b) by 685 days.

(21) Appl. No.: 16/712,452

(22) Filed: Dec. 12, 2019

(65) Prior Publication Data

US 2020/0216100 A1 Jul. 9, 2020

Related U.S. Application Data

(60) Provisional application No. 62/778,710, filed on Dec. 12, 2018.

(51) Int. Cl.
   *B61F 3/04* (2006.01)
   *B61D 11/00* (2006.01)
   *B61C 9/50* (2006.01)

(52) U.S. Cl.
   CPC ............. *B61F 3/04* (2013.01); *B61C 9/50* (2013.01); *B61D 11/00* (2013.01)

(58) Field of Classification Search
   CPC ............. B61F 3/04; B61C 9/50; B61D 11/00
   See application file for complete search history.

(56) References Cited

U.S. PATENT DOCUMENTS

| | | | |
|---|---|---|---|
| 1,973,267 A | 9/1934 | Rabey | |
| 2,402,266 A * | 6/1946 | Williams | B60K 17/36 474/902 |

(Continued)

FOREIGN PATENT DOCUMENTS

| | | |
|---|---|---|
| CN | 105501011 | 4/2016 |
| WO | WO 2010/043967 | 4/2010 |
| WO | WO 2020/121057 | 6/2020 |

OTHER PUBLICATIONS

International Preliminary Report on Patentability for International (PCT) Application No. PCT/IB2019/001305, dated Jun. 24, 2021, 6 pages.

(Continued)

*Primary Examiner* — Robert J McCarry, Jr.
(74) *Attorney, Agent, or Firm* — Sheridan Ross P.C.

(57) ABSTRACT

Systems and methods are provided for retrofitting, or producing, a truck assembly with a traction motor to propel a rail car or other vehicle. A traction drive frame assembly is an integrated unit combining the traction motor with its transmission means, an arrangement that prevents the traction drive frame from rotating when the traction motor is powered. The traction motor can be positioned in a space between a bolster and an axle of the truck assembly, and a jackshaft assembly can be positioned outside of the space. Then, one or more gears, pulleys, chains, etc. between the traction motor and the jackshaft assembly provide mechanical advantage and amplify torque transmitted from the traction motor to the jackshaft assembly. A second operable connection between the jackshaft assembly and the axle amplifies the torque a second time such that a relatively small traction motor propels a rail car or other vehicle.

18 Claims, 13 Drawing Sheets

(56) References Cited

U.S. PATENT DOCUMENTS

| | | | |
|---|---|---|---|
| 3,841,228 A * | 10/1974 | Hall | B61C 9/48 |
| | | | 105/131 |
| 8,113,121 B2 | 2/2012 | Roop | |
| 8,215,238 B2 | 7/2012 | Roop | |
| 8,215,591 B2 | 7/2012 | Roop | |
| 8,428,796 B2 | 4/2013 | Donnelly | |
| 8,561,545 B2 | 10/2013 | Donnelly | |
| 8,622,352 B2 | 1/2014 | Roop | |
| 9,032,881 B2 | 5/2015 | Goding | |
| 9,176,076 B2 | 11/2015 | Roop | |
| 9,302,685 B2 | 4/2016 | Goding | |
| 2021/0380150 A1 | 12/2021 | Soule et al. | |

OTHER PUBLICATIONS

U.S. Appl. No. 17/558,027, filed Dec. 21, 2021, Donnelly et al.
"Welcome to Parallel Systems," Parallel Systems, copyright date 2022, retrieved Jan. 28, 2022 from https://moveparallel.com/, 3 pages.
Bellan, "Former SpaceX engineers bring autonomous, electric rail vehicle startup out of stealth," TechCrunch, Jan. 19, 2022, retrieved from https://techcrunch.com/2022/01/19/former-spacex-engineers-bring-autonomous-electric-rail-vehicle-startup-out-of-stealth/, 18 pages.
Official Action for Australia Patent Application No. 2019397569, dated Jul. 5, 2022, 4 pages.
Official Action for Chile Patent Application No. 1546-2021, dated May 25, 2022, 21 pages.
International Search Report and Written Opinion for International (PCT) Patent Application No. PCT/IB2019/00893, dated Apr. 21, 2022, 7 pages.
International Search Report and Written Opinion for International (PCT) Patent Application No. PCT/IB2019/001305, dated Apr. 23, 2020, 9 pages.
Eudaly et al., "Santa Fe Rails, vol. 1," White River Productions, Kansas City, MO, 1996, pp. 1-13, 16-17, 20-21, 52-69, 144. Submitted in Two Parts.
Reed et al., "Comprehensive Guide to Industrial Locomotives, Third Edition," Rio Hondo, 2002, 400 pages. Submitted in Three Parts.
Reed et al., "Critters, Dinkys & Centercabs: The identification guide for small American gas and Diesel locomotives," Rio Hondo, 2000, 192 pages. Submitted in Two Parts.
Official Action for Canada Patent Application No. 3123163, dated Jan. 10, 2023, 4 pages.
Official Action for Chile Patent Application No. 1546-2021, dated Jan. 27, 2023, 20 pages.
Notice of Allowance for Chile Patent Application No. 1546-2021, dated Mar. 17, 2023, 1 page.

* cited by examiner

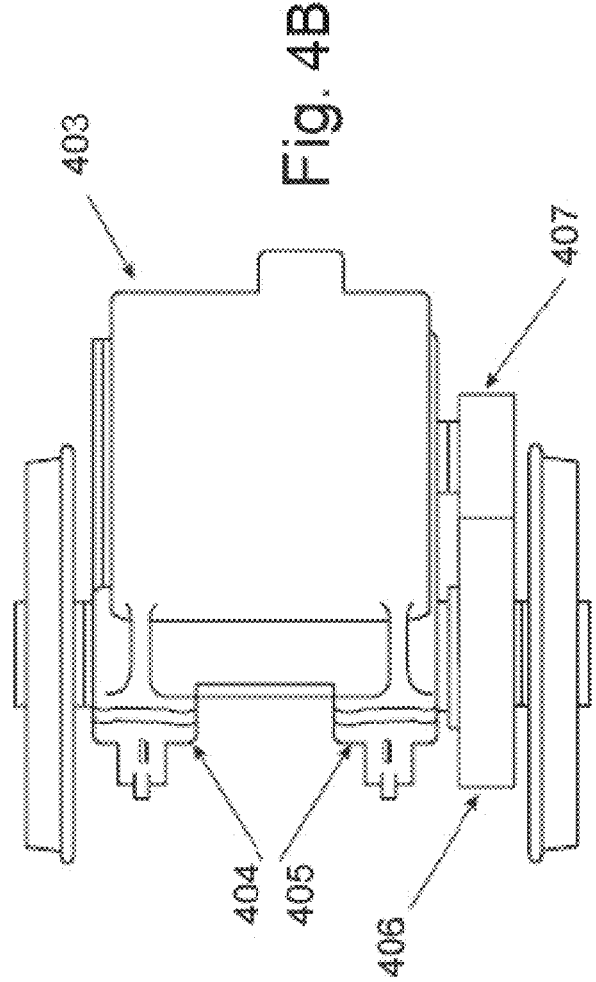
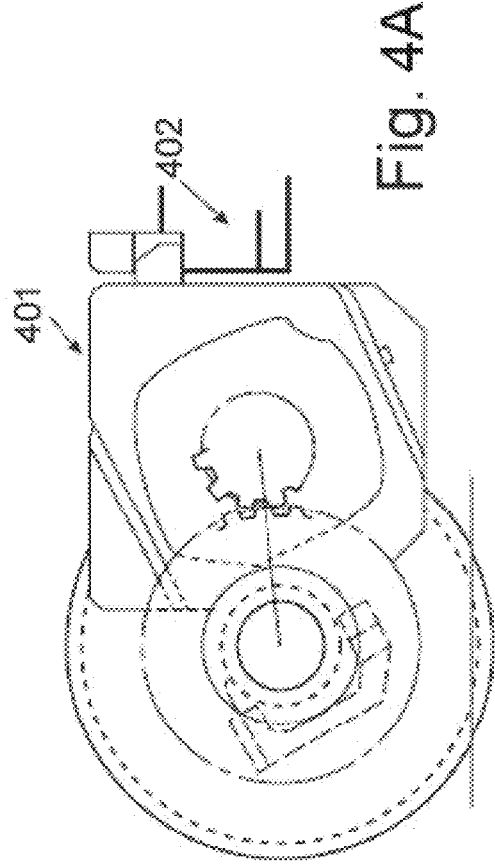
Fig. 4B (Prior Art)
Fig. 4A (Prior Art)

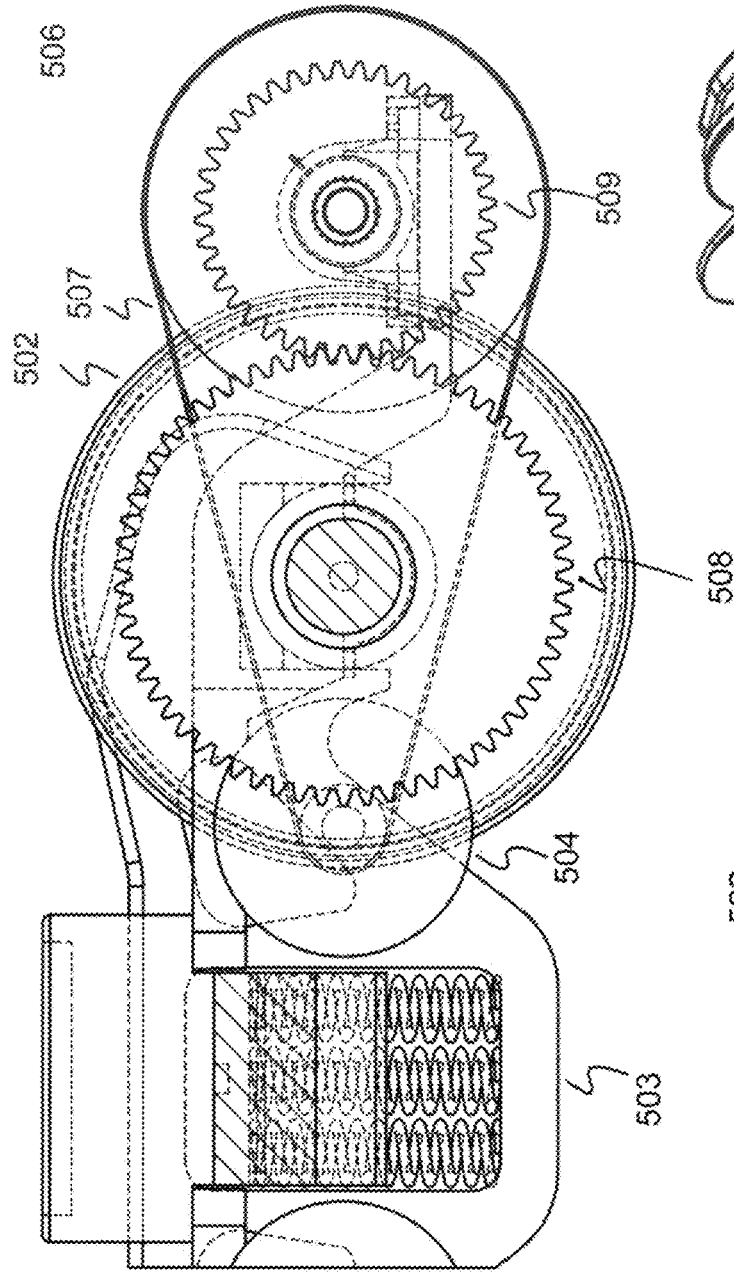
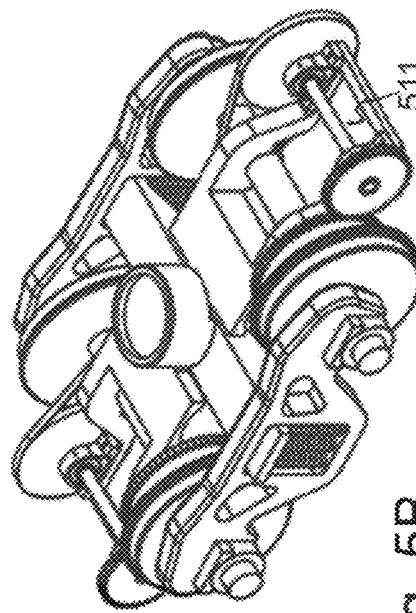
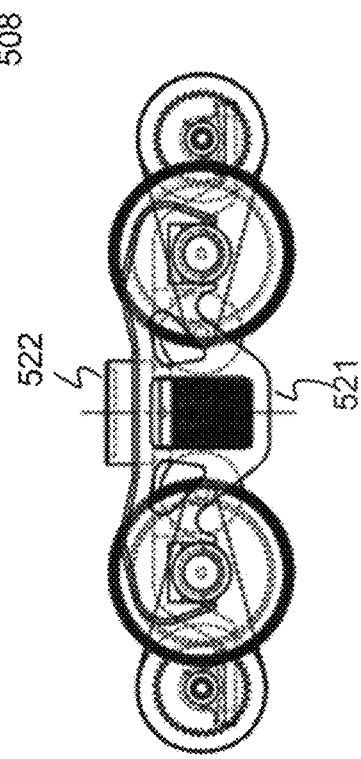
Fig. 5A
Fig. 5B
Fig. 5C

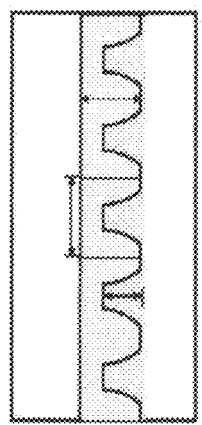
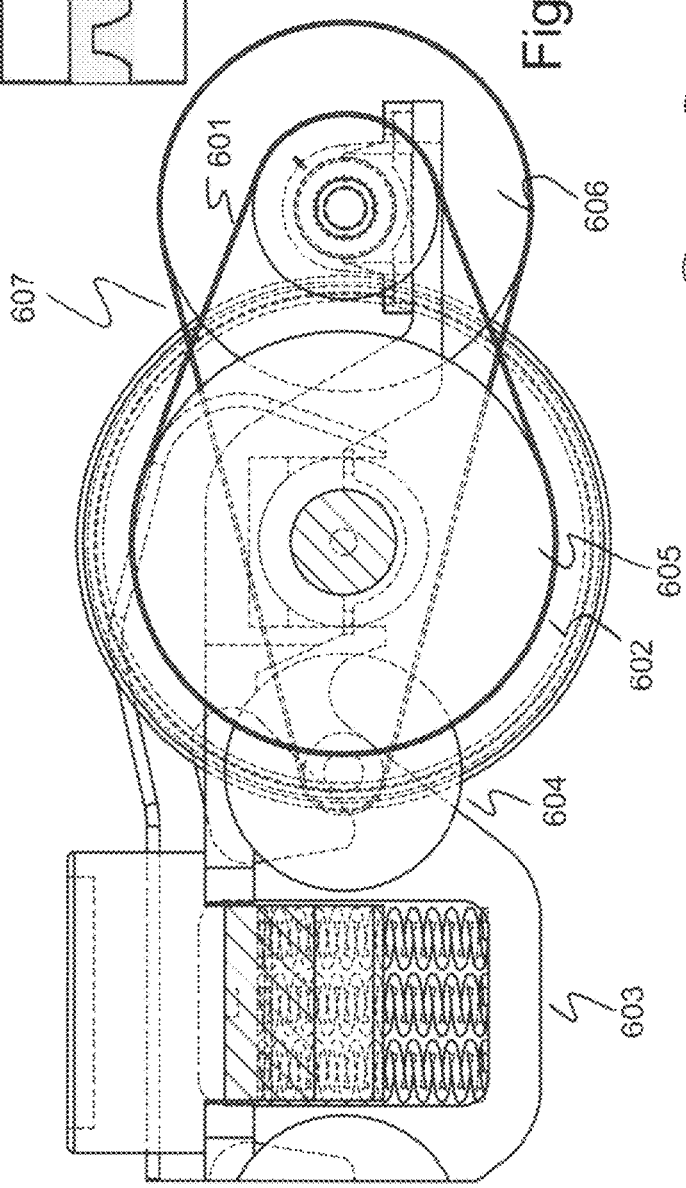
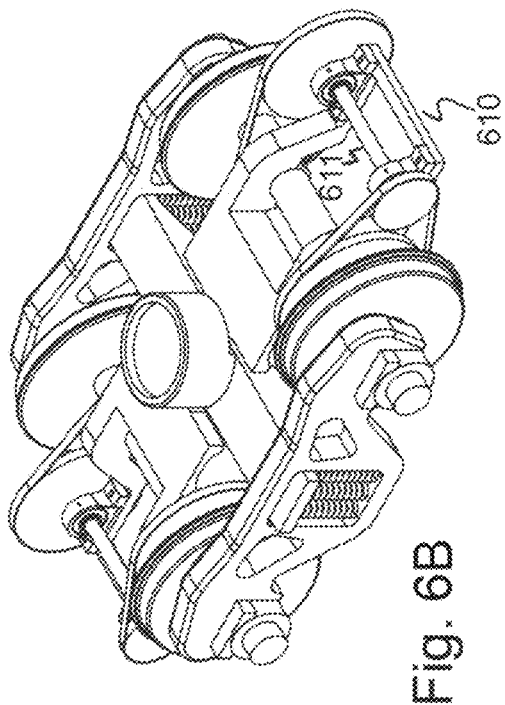
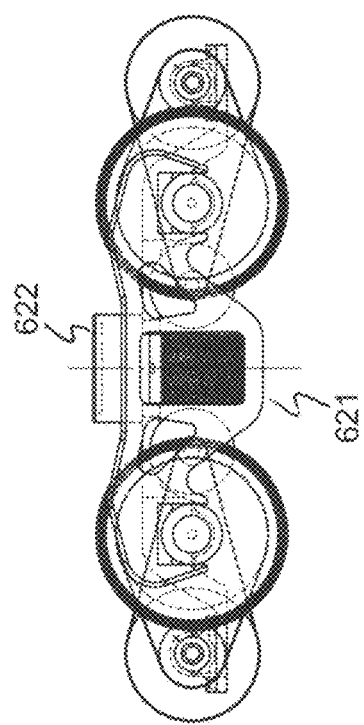
Fig. 6D
Fig. 6A
Fig. 6B
Fig. 6C

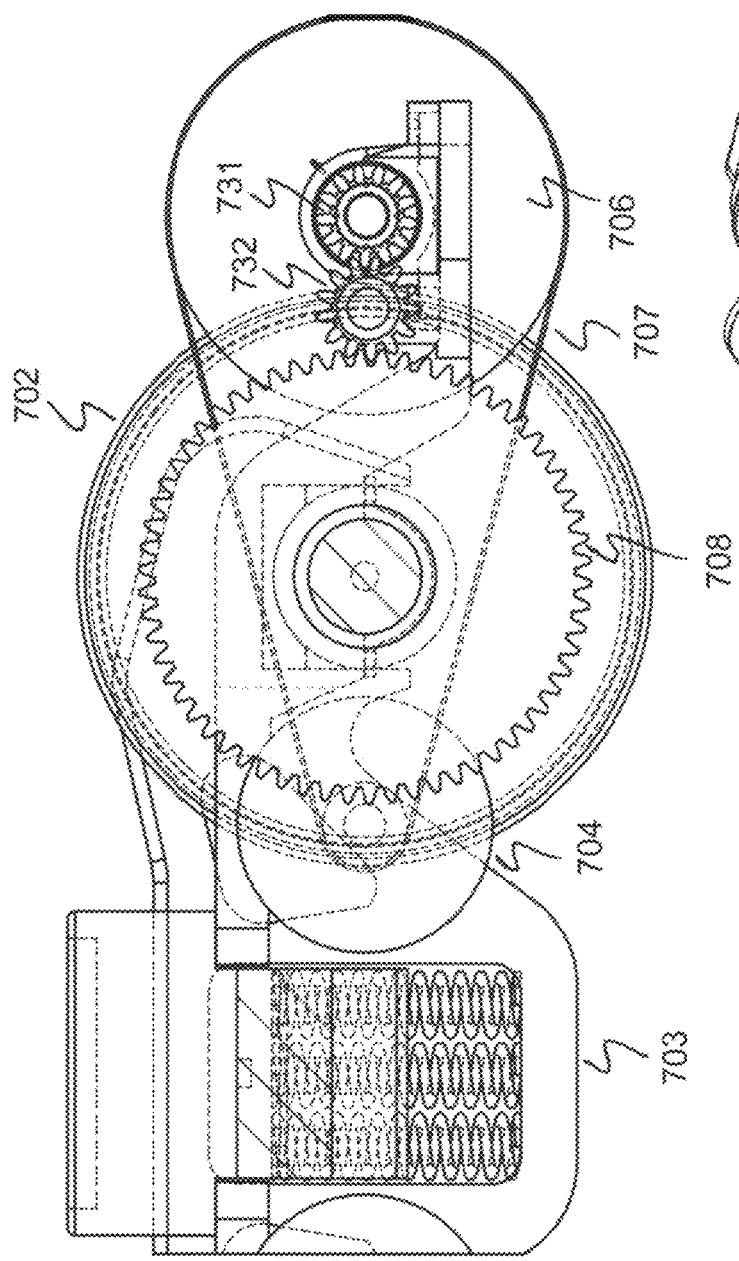
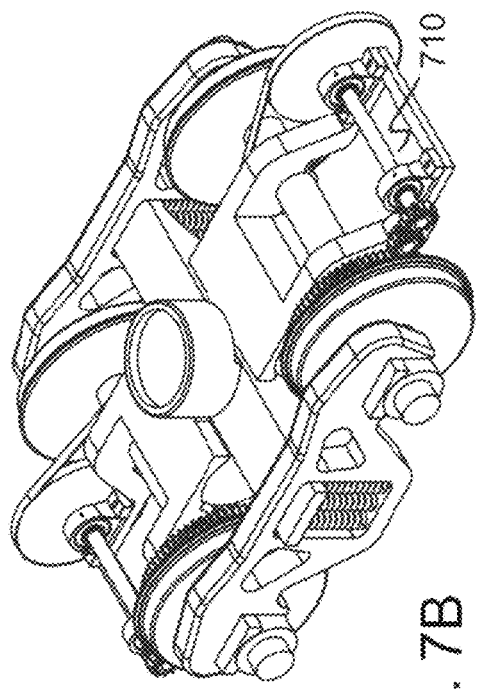
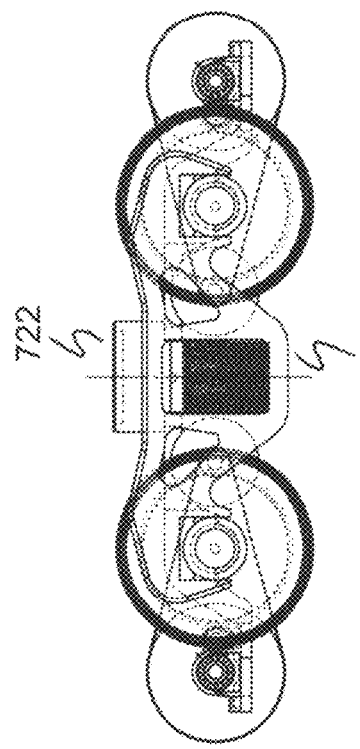
Fig. 7A
Fig. 7B
Fig. 7C

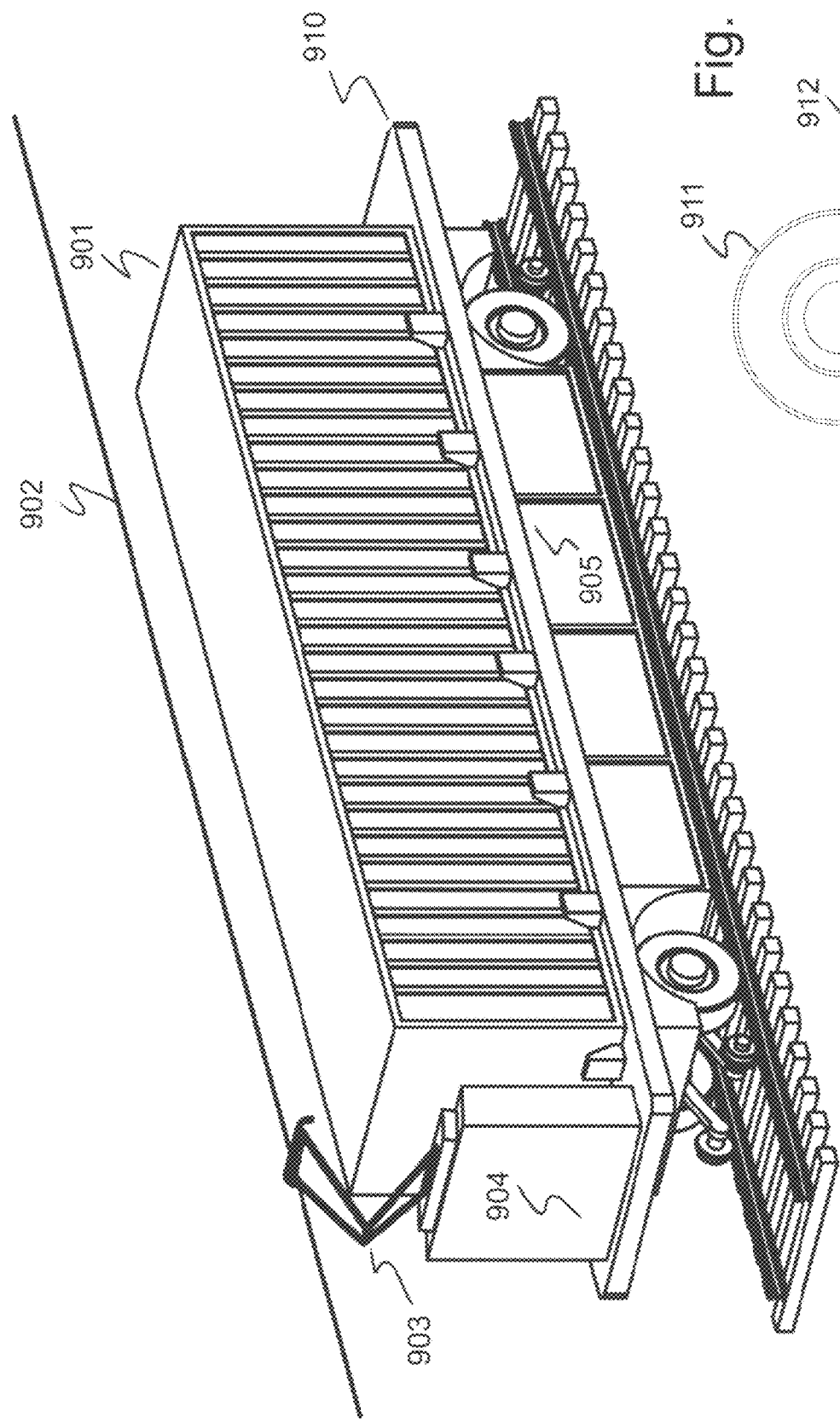
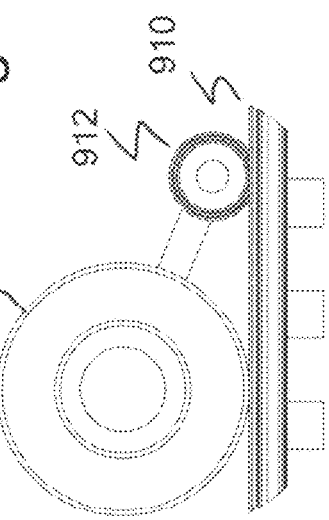
Fig. 9A
Fig. 9B

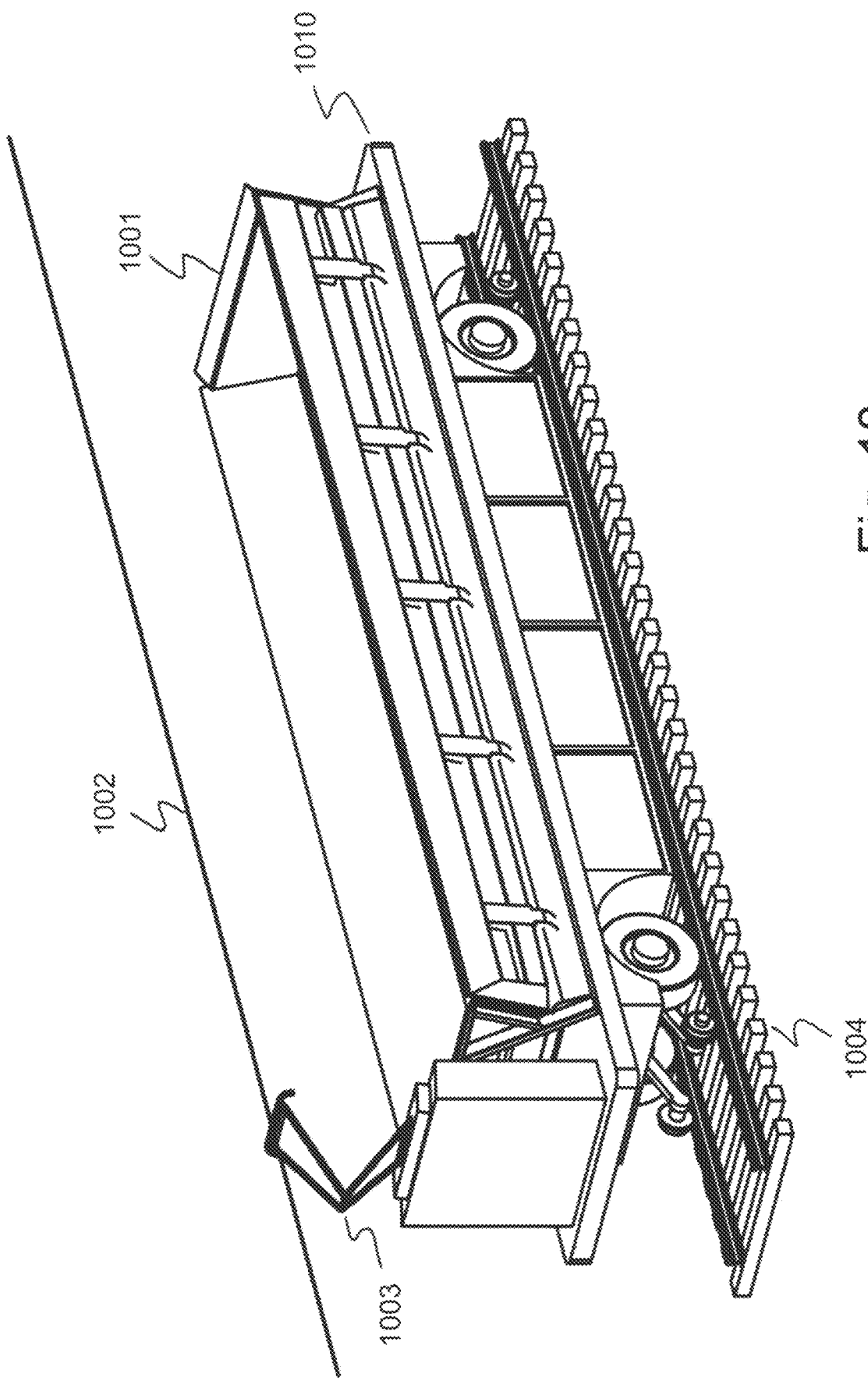

MOTORIZED RAIL CAR

CROSS REFERENCE TO RELATED APPLICATION

The present application claims the benefits of U.S. Provisional Application Ser. No. 62/778,710, filed Dec. 12, 2018, entitled "Motorized Rail Car", which is incorporated herein by this reference in its entirety.

FIELD OF INVENTION

The disclosure relates generally to rail vehicles and particularly to motorized, self-propelled rail vehicles for hauling freight or passengers.

BACKGROUND OF THE INVENTION

Moving bulk materials from a point of origin to a final destination over short distances, typically a few miles to up to about a hundred miles, can be expensive. Bulk materials can be moved these distances by truck, rail, conveyor system, pipeline or the like. The problem can be made more difficult when the point of origin or final destination moves as the case, for example, of an advancing work face in a mine or a cargo ship at a port.

Some of the problems of moving bulk materials are illustrated by examples from the mining industry. Materials including ore are moved around in mining operations by a number of means including:
large haul trucks
conveyor systems
slurry pipelines
rail transport Trucks have an advantage that they can go anywhere a road can be built. However, trucks, especially large mining trucks, are expensive to purchase and operate, and they usually require a driver. There are some mines that have automated trucks wherein the operator controls the truck from a remote location or autonomously using an algorithm. Nevertheless, haulage with large mining trucks accounts for a significant cost in the operation of a mine with their tire and fuel expenses.

Most mining haul trucks have a two-axle design, but some have had three axles. Haul truck load capacities range from 35 tons to 450 tons. Large quarry-sized trucks range from 40 to 100 tons. The largest, highest-payload-capacity haul trucks are referred to as ultra class trucks. The ultra class includes all haul trucks with a payload capacity of about 275 tons up to 496 tons.

Conveyor systems have advantages in certain mining situations where the ore and environmental situations are favorable. A major drawback of conveyor systems is that the ore or waste rock usually must be crushed. In other situations, conveyor systems can be maintenance intensive and can cause serious delays in production when they are shut down for repair. For example, ore in oil sands surface mines can be like hard rock in the winter and sticky asphalt in the hot summer months, making conveyor maintenance expensive in both seasons. Also if a section of conveyor breaks down, the whole conveyor line must be shut down until the section is repaired. Conveyor systems in underground mines can be particularly costly to maintain and repair because of the close quarters typical of most underground mining operations.

Slurry transport systems are suitable for ores that can be formed into a slurry. A major drawback of slurry systems is that the ore or waste rock must be crushed to small sizes that are compatible with slurry transport systems. These systems also require substantial amounts of water to operate. These systems, also called hydro-transport systems, are often used in conjunction with another transport system since the slurry cannot usually be formed at or near the working face. Slurry systems are often used where transport distances are large and fixed such as for example from a slurry plant on a mine site to a remote processing plant.

Rail systems have an advantage that they are a highly fuel efficient system because of low rolling resistance. The have a disadvantage that tracks must be laid and are relatively difficult to move, for example when the mining face moves in an open pit operation. Industrial rail systems typically involve one or more locomotives pulling or pushing a number of unpowered bulk material carrier cars. In this configuration, a disadvantage of mining rail systems is that they are limited by track adhesion considerations to grades in the range of about 5% to about 12%.

Small load carrying, self-powered transfer rail cars are known. The Atlas Car & Mfg. Co. of Cleveland Ohio makes electric transfer cars for steel plants, ore processing refineries and other applications. The General Electric Company has manufactured small load carrying locomotives (10 ton load capacity) in the early 1900s. Small battery powered load carrying locomotives (5 ton load capacity) have been manufactured for the explosives industry. None of these has been automated nor have they utilized multiple propulsion sources (internal combustion engines, energy storage and grid power).

U.S. Pat. No. 8,428,796 entitled "Rail Conveyance System for Mining", which is incorporated herein by reference, discloses a rail-based system for moving materials and in particular relates to a rail-based system comprised of automated self-powered rail cars operating independently to transport material such as 1) ore from a work face in a mine to a processing plant or 2) cargo from a dock to a large transportation hub. A number of automated self-powered cargo carrying rail cars are operated on a track conveyance system wherein the cars can also be controlled remotely by either manual or automated means or by a combination of the two. Thus, the rail conveyance system can be partially or fully automated. The rail cars are individually operable by any of several propulsion means including an on-board engine or engines, an energy storage system such as for example a battery pack or by an outside source of power such as an overhead wire (catenary) or an electrified third rail. Each car includes two or more truck assemblies. Each truck assembly may include one or more axles. Preferably, at least one axle on each car is powered, more preferably most of the axles are powered, and even more preferably all the axles are powered. The principal reason for powering at least one and most preferably all of the axles is to provide maximum gradeability so that the cars are capable of ascending grades under good track conditions in the range of about 10% to about 25%, without wheel slippage. This is a benefit especially for application in open pit or underground mines where a rail-based haulage system capable of ascending steep grades offers several advantages over a truck-based or conveyor-based haulage system.

U.S. Pat. No. 8,561,545 entitled "Industrial Locomotive Construction" discloses a method for constructing a locomotive, in part, from serviceable used parts from one or more larger locomotives. The principal part that is used in this new locomotive configuration is a single, used locomotive truck assembly. U.S. Pat. No. 8,561,545 describes a method of building a simple locomotive that is well adapted to switching and spotting functions that shares commonality with other larger locomotives both in terms of components and design.

There is a need for a cost effective method of motorizing a mass produced rail freight car truck assembly that will enable the freight car to ascend grades of about 10% to about 25% while fully loaded and under most weather conditions.

SUMMARY OF THE INVENTION

These and other needs are addressed by the present disclosure. Some embodiments and configurations of the present disclosure are directed generally to providing a method of powering individual rail freight cars by modifying one or both the truck assemblies of the rail freight car so that a traction motor or motors can be installed to drive one or both axles of each truck assembly. An engine or engines, a battery pack and/or current collectors may be mounted on the rail freight car to provide power for the traction motors enabling the rail freight car to be self-propelled.

If an engine is used then the engine is an internal combustion engine such as a diesel, a gasoline or a gas turbine engine.

This disclosure describes a process to motorize a common mass-produced rail car truck assembly with few changes to the truck itself. A locomotive style truck built with traction motors is disclosed. A motor design is disclosed that is either a 'gearless' high specific torque traction motor arrangement or a high torque traction motor with an integral gear to develop the required torque to allow the motorized rail car to ascend grades as steep as at least about 10%. The novel concept is the modifying of an existing freight car truck by adding one or more traction motors capable of high torque and high tractive effort. This, in turn, allows the rail freight car to be self-powered by catenary, third rail or an engine on the rail car. This, in turn, allows the rail freight car to be operated under remote control. These rail freight cars can be used individually or in short trains to move freight or passengers on any track system including panel tracks and tracks laid on steep grades.

Modified Freight Truck Configurations

In one configuration, a traction motor is attached to a frame and a sprocket on the shaft of the traction motor drives a synchronous belt which drives a pinion sprocket on a jackshaft assembly. The pinion gear attached to the shaft of the jackshaft assembly drives a bull gear which is mounted on the axle shaft of a rail car wheel. The jackshaft sprocket transmits the drive force from the synchronous belt to the pinion gear and then to the bull gear attached to the rail car wheel.

In another configuration, a traction motor is attached to a frame and a sprocket on the shaft of the traction motor drives a primary synchronous belt which drives a sprocket on a jackshaft assembly. A smaller sprocket on the shaft of the jackshaft assembly drives a rail car wheel via a secondary synchronous belt. The jackshaft sprocket transmits the drive force from the primary belt to the secondary belt and then to a sprocket attached to the rail car wheel.

In yet another configuration, a traction motor is attached to a frame and a sprocket on the shaft of the traction motor drives a synchronous belt which drives a pinion sprocket on a jackshaft pulley assembly. The pinion gear attached to the shaft of the jackshaft pulley assembly drives an idler gear which, in turn, drives a bull gear mounted on the axle shaft of a rail car wheel. This configuration with the intermediate idler gear permits a greater mechanical advantage than does the direct meshing of the pinion and bull gears.

A traction drive frame assembly, that is used in all configurations, is disclosed. The traction drive frame assembly is an integrated unit combining the traction motor with its transmission means. The traction drive frame assembly is attached to the bolster assembly by a custom fixture and clamped to the wheel axle of the freight car truck assembly. This arrangement prevents the traction drive frame from rotating with respect to the truck when the traction motor is powered.

Road-Rail Container Mover Application

A road-rail vehicle, capable of operating on railroad tracks or on regular roads, has rubber tires for operating on regular roads and has pilot wheels that can be lowered on to rails when operating on railroad tracks.

A low emissions road-rail dock-side container mover is comprised of a rail car body, a power electronics module and receives electrical power from a pantograph. The pantograph connects a single wire catenary to the power electronics module which connects to the traction motors on one or more driver axles. The traction motors are grounded through connections to the rail wheels which, in turn, connect to the rails. An intermodal freight container is secured to the car body and is removable by crane. The container mover is powered by the rubber tires on the rail tracks. The pilot rail wheels keep the container mover on the tracks and can be retracted when not needed while on a road or other non-rail surface.

A typical container mover route might be from dockside to a heavy rail terminus several miles away and may involve both road surfaces and rail as well as grades of 10% or more. The container mover is loaded at dock side while on a hard surface with the rail guide wheels retracted. The container mover then operating on catenary, third rail or energy storage batteries leaves the dockside and proceeds by road or light rail tracks to an area away from the docks. The container mover then proceeds to the rail head via road or light rail by operating on a catenary, a third rail or by its own on-board power source.

Road-Rail Mine Haul Application

A low emissions road-rail mine haul vehicle is comprised of a rail car body, a power electronics module and receives electrical power from pantograph. The pantograph connects a single wire catenary to the power electronics module which connects to the traction motors on one or more driver axles. The traction motors are grounded through connections to the rail wheels which, in turn, connect to the rails. An ore container box is attached to the rail car body. The ore container box can be side-dumped by hydraulic pistons located under the container box. The mine hauler is powered by the rubber tires on the rail tracks. The pilot rail wheels keep the dumpster on the tracks and can be retracted when not needed while on a road or other non-rail surface.

A mine hauler route might be from the advancing ore face in a surface or underground mine to an ore processing plant several miles away and may involve both road surfaces and rail as well as grades of 10% or more. The mine hauler is loaded near the mine face while on a mine road with the rail guide wheels retracted or loaded on specially laid panel tracks. As is well-known, panel tracks can be quickly extended as the mine face advances. The mine hauler then operating on catenary, third rail, energy storage batteries or its own low emission engines leaves the mine face and proceeds by road or light rail tracks out of the mine. The mine hauler then proceeds to the ore processing plant via road, panel track or existing heavy rail line by operating on a catenary, a third rail or by its own on-board power source.

Panel Tracks

The present disclosure also uses a combination of permanent track sections and sections of track formed by panel track which can be laid down quickly and reconfigured as needed. This capability is an advantage for example when a terminus served by the system is constantly changing, such as, for example, an advancing mine face. Panel tracks are discussed in U.S. Pat. No. 8,428,796 entitled "Rail Conveyance System for Mining"

Rail Only Configuration

Both the dock-side container mover and the mine haul vehicle can be configured as rail only vehicles. This vehicle is similar to that of the above mentioned road-rail vehicles except that the road-rail truck assemblies are replaced by modified freight car truck assemblies of the present disclosure. The rail only configuration is discussed in U.S. Pat. No. 8,428,796 entitled "Rail Conveyance System for Mining"

In some embodiments of the present disclosure, a truck assembly for a rail car includes: a bolster assembly connected to side frames; two or three axles rotatably connected to the side frames, wherein at least one wheel is connected to the axle, and a space is formed between the axle and the bolster assembly; a traction motor connected to the bolster assembly and positioned in the space, wherein a shaft of the traction motor rotates about an axis that is parallel to an axis of the axles, and the shaft has a traction sprocket; a jackshaft assembly positioned outside of the space, the jackshaft assembly having a shaft with a jackshaft sprocket and a pinion gear, wherein the jackshaft sprocket has a larger diameter than the traction sprocket; a belt or chain connected to the traction sprocket and the jackshaft sprocket to transfer torque from the shaft of the traction motor to the shaft of the jackshaft assembly; and a bull gear connected to the axle and operably connected to the pinion gear. The bull gear has a larger diameter than the pinion gear whereby the pinion gear and the bull gear transfer torque from the shaft of the jackshaft assembly to the axle and the at least one wheel to propel the rail car.

In some embodiments, a truck assembly for a rail car includes: a bolster assembly connected to side frames; an axle rotatably connected to the side frames, wherein at least one wheel is connected to the axle, and a space is formed between the axle and the bolster assembly; a traction motor connected to the bolster assembly and positioned in the space, wherein a shaft of the traction motor rotates about an axis that is parallel to an axis of the axles, and the shaft has a traction sprocket; a jackshaft assembly positioned outside of the space, the jackshaft assembly having a shaft with a jackshaft sprocket and a pinion gear, wherein the jackshaft sprocket has a larger diameter than the traction sprocket; a belt or chain connected to the traction sprocket and the jackshaft sprocket to transfer torque from the shaft of the traction motor to the shaft of the jackshaft assembly; a bull gear connected to the axle, wherein the bull gear has a larger diameter than the pinion gear; and a belt or chain connected to the pinion gear and the bull gear to transfer torque from the shaft of the jackshaft assembly to the axle and the at least one wheel to propel the rail car.

The truck assembly can further include an idler gear connected to the pinion gear and the bull gear. The idler gear transfers torque from the pinion gear to the bull gear.

In terms of overall gear ratio from traction motors to rail car wheels, the ratio of about 10:1 to about 16:1 will result in speeds of about 60 mph with a 38" wheel and tractive effort of about 12,500 lbs per driven axle with motors that will fit within the space between the axle and bolster assembly. Typical gearing on a locomotive between the pinion and bull gear is about 4.133:1 and synchronous belts will operate easily at about 4:1. Therefor achieving an overall gear ratio of about 16:1 or even higher, in two stages, is practical.

In terms of individual stages for a total gear ratio between traction motor and rail car wheel of about 10:1 to about 16:1:
Traction motor shaft to jackshaft sprocket is about 4:1
Pinion gear to bull gear is about 2:1 to about 4.3:1
Pinion gear to idler gear to bull gear is about 4:1 to about 8:1

The bolster assembly can be spring-biased in one direction relative to the side frames. The belt or chain can form a continuous loop, and the axle can extend through the continuous loop. In some configuration, the first belt or chain forms a continuous loop, and the axle extends through the continuous loop, and the second belt or chain forms a continuous loop, and the axle extends through the continuous loop. The material of the first and/or second belts or chains can be one of a carbon fiber or a steel or a combination of both carbon fiber and steel.

The axis of the axle, the axis of the shaft of the traction motor, and an axis of the shaft of the jackshaft assembly can be arranged in a common plane.

The truck assembly can further include a second axle connected to the side frames, a second jackshaft assembly operably connected to the second axle, and a second traction motor operably connected to the jackshaft assembly, wherein the second traction motor transfers torque to the second jackshaft assembly, and the second jackshaft assembly transfers torque to the second axle.

In some embodiments, a method of retrofitting a truck assembly of a rail car with a traction motor includes: providing a truck assembly having a bolster assembly connected to side frames and an axle connected to the side frames, wherein a wheel is positioned at an end of the axle, and wherein a space is defined between the bolster assembly and the axle, and a brake rigging is connected to the bolster assembly and positioned in the space; removing the brake rigging from the bolster assembly and the space; connecting a traction motor to the bolster assembly and positioning the traction motor in the space; positioning a jackshaft assembly outside of the space on an opposing side of the axle from the traction motor; transferring torque from a shaft of the tractor motor to a shaft of the jackshaft assembly; and transferring torque from the shaft of the jackshaft assembly to the axle to propel the rail car.

The method can further include the steps of: removing the wheel from the axle; positioning a bull gear on the axle and positioning a pinion gear on the shaft of the jackshaft assembly; and connecting the wheel to the axle, wherein the pinion gear and the bull gear transfer torque from the shaft of the jackshaft to the axle.

The method can further include the steps of: providing a traction sprocket on the shaft of the traction motor and providing a jackshaft sprocket on the shaft of the jackshaft assembly; positioning a pulley around the traction sprocket and the jackshaft sprocket to transfer torque from the shaft of the tractor motor to the shaft of the jackshaft assembly.

The method can further include the steps of: removing the wheel from the axle; positioning a bull sprocket on the axle and position a pinion sprocket on the shaft of the jackshaft assembly; positioning a second pulley around the bull sprocket and the pinion sprocket; and connecting the wheel to the axle, wherein the second belt or chain transfers torque from the shaft of the jackshaft assembly to the axle.

The belt or chain can form a continuous loop, with the axle extending through the continuous loop.

The method can further include the step of connecting a new brake system to at least one of the bolster and the side frame, wherein the new brake system is operably connected to the axle to slow or stop rotation of the axle.

The following definitions are used herein:

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

Adhesion is a measure of the resistance of friction to slippage between two parallel planes. In the case of a locomotive rail wheel, the parallel plane is the point on the steel rail wheel where the rail wheel contacts the steel rail. The maximum force or pull that a locomotive can generate in order to pull a train is limited by the weight of the locomotive and the amount of adhesion that it can maintain without wheel slippage.

Autonomous control means controlled by a computer algorithm with sensor inputs such as, for example, spatial positioning, vehicle speed and location of other nearby objects.

A bogie is a term used outside of North America that means a truck assembly (see definition of truck assembly).

A bolster is a structural component connecting a locomotive truck assembly to the frame of a locomotive so as to allow vertical, transverse and/or longitudinal movements of the truck assembly with respect to the locomotive car frame. For a locomotive with more than one truck assembly, the bolster can allow the locomotive body to rotate on the bolster assembly in order to negotiate curves and grades.

A bull gear refers to the larger of two spur gears that are in engagement in any machine and is used as the output gear or driven gear.

A burden car is a single car that carries cargo and provides its own propulsion.

A driver (or driven) axle is a rotating axle that transmits power from the propulsion system to the rails. A driver may refer to an axle or a wheel.

Dynamic braking is typically implemented when the electric propulsion motors are switched to generator mode during braking to augment the braking force. The electrical energy generated is typically dissipated in a resistance grid system. Dynamic braking can also be accomplished using pneumatics or hydraulics.

An energy storage system refers to any apparatus that acquires, stores and distributes mechanical or electrical energy which is produced from another energy source such as a prime energy source, a regenerative braking system, a third rail and an overhead wire and any external source of electrical energy. Examples are a battery pack, a bank of capacitors, a compressed air storage system and a flywheel.

An engine refers to any device that uses energy to develop mechanical power, such as motion in some other machine. Examples are diesel engines, gas turbine engines, microturbines, Stirling engines and spark ignition engines.

A floating bolster means a transverse floating beam member of a truck suspension system supporting the weight of the locomotive body. Such a bolster is not rigidly connected to either the locomotive body or the truck assembly on which it sits.

A freight container as used herein is a large standardized intermodal shipping container designed and built for intermodal freight transport. These containers can be used across different modes of transport, for example from ship to rail to truck, without unloading and reloading their cargo Grade (also called slope, incline or gradient) of a physical feature refers to the angle equal to the arctangent of the rise over the run. One way to convey grade is as an angle of inclination to the horizontal expressed in degrees. Another way to convey grade is by rise divided by run expressed as a percentage. In the U.S., this percentage grade is the most commonly used unit for communicating slopes in transportation such as rail tracks. In railroad terminology, grade is usually expressed as a percentage, but this is easily converted to the angle from the horizontal or the other expressions. A 1% grade means a rise of 1 meter over 100 meters of horizontal travel or arctan ($1/100$)=0.5729 degrees.

Gradeability means the capability of a vehicle to ascend grade.

An idler axle is a rotating axle that is not powered. An idler may refer to an axle or a wheel.

The term jackshaft in the context of railroad equipment refers to an electric-motor driven railroad truck wherein the motor is geared to a jackshaft mounted between the side frames. A sliding Dog clutch inside the jackshaft can be used to select one of several gear ratios on a belt or chain drive to the driven axle. Railroad jackshafts are generally connected to the driving wheels using side rods. A jackshaft is an intermediate shaft used to transfer power from a powered shaft such as the output shaft of an engine or motor to driven shafts such as the drive axles of a locomotive. As applied railroad locomotives in the 19th and 20th centuries, jack shafts were typically in line with the drive axles of locomotives and connected to them by side rods. In general, each drive axle on a locomotive is free to move about one inch vertically relative to the frame, with the locomotive weight carried on springs. This means that if the engine, motor or transmission is rigidly attached to the locomotive frame, it cannot be rigidly connected to the axle. This problem can be solved by mounting the jack shaft on unsprung bearings and using side-rods or chain drives. In the early 20th century, large numbers of jack shaft-driven electric locomotives were built for heavy mainline service. Jack shaft drives were also used in many early gasoline and diesel locomotives that used mechanical transmissions.

Last mile is used to describe the difficulty in getting cargo or people from a transportation hub such as rail yards, truck depots or cargo ports to their final destination. When users have difficulty getting from their starting location to a transportation network, the scenario may alternatively be known as the "first mile problem."

A line-haul locomotive is a locomotive primarily engaged in line-haul railroad passenger and freight operations from one city to another as differentiated from local switching service. A locomotive used for the movement of trains between terminals and stations on the main or branch lines of the road, exclusive of switching movements.

The term "means" as used herein shall be given its broadest possible interpretation in accordance with 35 U.S.C., Section(s) 112(f) and/or 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

A pantograph is an improvement on the simple trolley pole primarily because the pantograph allows an electric vehicle to travel at much higher speeds without losing contact with the overhead lines.

A pinion gear is a comparatively small gear that is usually used as the driving gear or input gear A prime power source refers to any device that uses energy to develop mechanical or electrical power, such as motion in some other machine. Examples are diesel engines, gas turbine engines, microturbines, Stirling engines, spark ignition engines or fuel cells.

A road-rail vehicle is a vehicle which can operate both on rail tracks and a conventional road. They may be purpose built road-rail vehicles or they may be converted road vehicles. built road-rail vehicles keep their normal wheels with rubber tires, but are fitted with additional flanged steel wheels (also called guide wheels or pilot wheels) for running on rails. Propulsion is typically through the conventional tires, the flanged wheels being free-rolling; the rail wheels are raised and lowered as needed.

A sheave is a pulley with a grooved wheel for holding a belt or chain and is used exclusively to mean "drive pulley"

A snubber, as used herein, is a mechanical means to provide a restraint force to control belt tensioning and additional contact area during abnormal conditions.

A sprocket or sprocket-wheel is a profiled wheel with teeth, or cogs, that mesh with a chain, track, synchronous belt or other perforated or indented material.

A synchronous belt is a flexible belt with teeth molded onto its inner surface. It is designed to run over matching toothed pulleys or sprockets. Asynchronous belt is also known as a toothed belt or cogged belt. Synchronous belts are used where high-power transmission is desired. As used herein, a chain drive is a form of synchronous belt.

A traction motor is a motor used primarily for propulsion such as commonly used in a locomotive. Examples are an AC or DC induction motor, a permanent magnet motor and a switched reluctance motor.

Tractive effort is the force applied by the driving wheels parallel to the track. Tractive effort is a synonym of tractive force, typically used in railway engineering terminology when describing the pulling power of a locomotive. The tractive effort provided by a particular locomotive varies depending on speed and track conditions, and is influenced by a number of other factors.

A truck assembly is an undercarriage assembly of a locomotive incorporating the axle-wheel sets, suspension, brakes and a means of driving the wheels if powered. The truck assembly supports the weight of the locomotive or railcar, provides the propulsion, suspension and braking. (Outside of North America, a truck assembly is known as a bogie assembly.) On locomotives, traction motors, typically one on each driving axle, provide propulsion to the wheels. The weight of the locomotive or railcar typically rests on a bolster with center plate which allows the trucks to pivot so the rail vehicle can negotiate a curve. Below the bolster, there is typically a leaf, coil or elastomeric springs in the truck suspension system that absorbs mechanical shocks and maintains equal and constant downward force on the driven wheels.

The phrases at least one, one or more, and and/or are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It should be understood that every maximum numerical limitation given throughout this disclosure is deemed to include each and every lower numerical limitation as an alternative, as if such lower numerical limitations were expressly written herein. Every minimum numerical limitation given throughout this disclosure is deemed to include each and every higher numerical limitation as an alternative, as if such higher numerical limitations were expressly written herein. Every numerical range given throughout this disclosure is deemed to include each and every narrower numerical range that falls within such broader numerical range, as if such narrower numerical ranges were all expressly written herein. By way of example, the phrase from about 2 to about 4 includes the whole number and/or integer ranges from about 2 to about 3, from about 3 to about 4 and each possible range based on real (e.g., irrational and/or rational) numbers, such as from about 2.1 to about 4.9, from about 2.1 to about 3.4, and so on.

The preceding is a simplified summary of the disclosure to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below.

BRIEF DESCRIPTION OF THE DRAWINGS

The present disclosure may take form in various components and arrangements of components, and in various steps and arrangements of steps. The drawings are only for purposes of illustrating the preferred embodiments and are not to be construed as limiting the disclosure. In the drawings, like reference numerals may refer to like or analogous components throughout the several views.

FIGS. 4a and 4b are schematics of a prior art axle hung nose suspended traction motor in a truck assembly.

FIGS. 5a-5c are schematics of a motorized freight truck showing belts and gears.

FIGS. 6a-6d are schematics of a motorized freight truck showing belts only.

FIGS. 7a-7c are schematics of a motorized freight truck showing belts, gears and idler.

FIG. 9a is an isometric view of a road-rail dock-side container mover and FIG. 9b is a close-up view of a road/rail wheel.

FIG. 10 is an isometric view of a road-rail mine haul vehicle.

DETAILED DESCRIPTION OF THE DRAWINGS

This disclosure relates to motorizing a common mass-produced rail freight car truck assembly with few changes to the truck itself. In this disclosure, an apparatus and a method are described that relates to a heavy, multi-axle, self-propelled freight rail car and it relates more particularly to a method of configuring a traction motor and transmission means in a standard two axle truck assembly.

Prior Art

Figure 1:
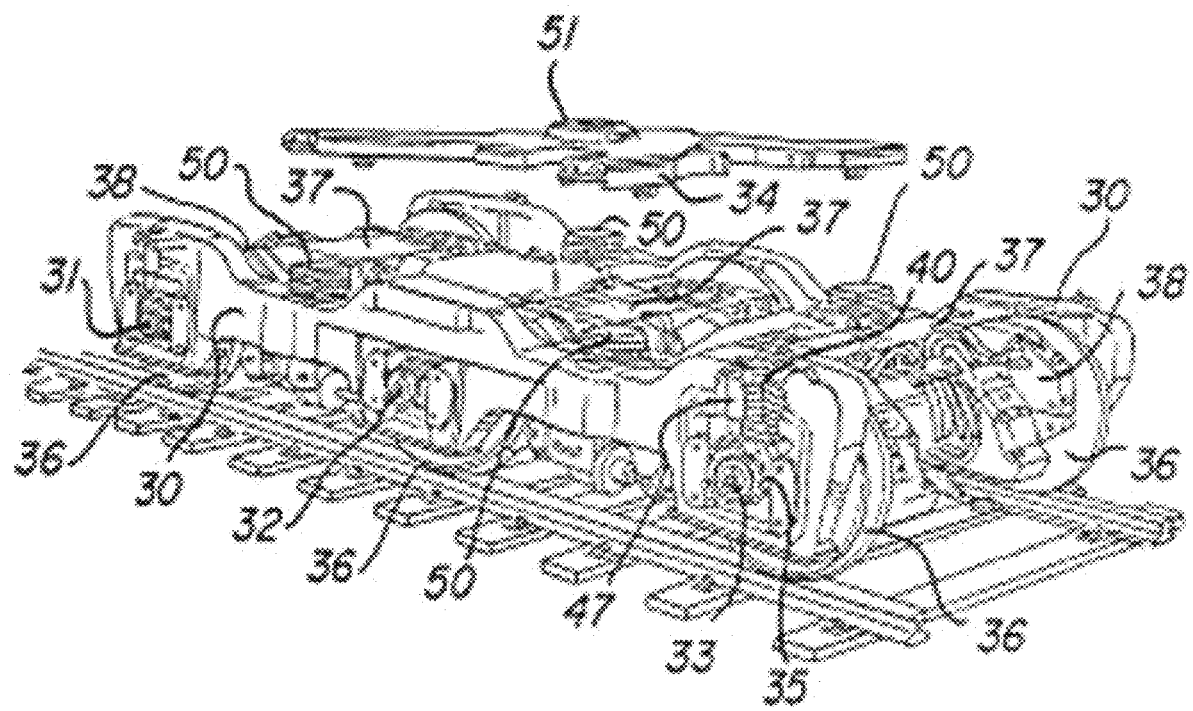
FIG. 1 is a schematic of a prior art locomotive truck assembly.

FIG. 1 shows a prior art locomotive truck assembly taken from U.S. Pat. No. 4,793,047 entitled "Method of Adjusting the Distribution of Locomotive Axle Loads". As is shown in FIG. 1 (the description of which is taken from that of FIG. 2 of U.S. Pat. No. 4,793,047), each truck assembly comprises metal side frames 30, three parallel axle-wheel sets 31, 32, and 33, and a floating bolster beam 34. Each axle-wheel set supports the frame by means of a pair of conventional journal bearings located in housings 35 near opposite ends of the axle on the outboard sides of the associated wheels 36. Axle-hung electric traction motors 37 are disposed between the wheels of the respective axle-wheel sets, and the rotor of each motor is mechanically coupled to the associated axle-wheel set by gearing housed in a gear box 38. In a conventional manner, the traction motors associated with the front and middle axles 31 and 32 are located to the rear of these axles, respectively, whereas the traction motor associated with the rear axle 33 is located to the front thereof.

The primary suspension system of each truck comprises twelve dual, concentrically nesting, vertical helical springs (sometimes called coil springs) arranged in six sets of two each, with the springs in each set being disposed in compression between a spring seat on top of a separate one of the axle journal housings 35 and a cooperating pocket in a side channel of the side frame 30. The outboard wall of one such pocket has been cut away in FIG. 1 to reveal a typical pair 40 of these nesting springs. A shock absorber or "snubber" 47 is connected in parallel with at least one set of axle springs on each side of the truck assembly.

The secondary suspension system of each truck comprises four rubber bolster mounts 50 which are respectively seated on pads located on top of the inter-axle sections of the two side channels of the side frame 30. These bolster mounts support the bolster beam 34 at load points near the four corners thereof. FIG. 1 shows the bolster beam 34 detached from the rest of the truck assembly so as to expose the four bolster mounts 50. Each bolster mount comprises a unitary stack of curved rubber pads interleaved with correspondingly curved steel plates. The rubber pads are relatively soft horizontally and will deflect in shear to permit a controlled amount of lateral motion between opposite ends of the bolster mount, which motion is accompanied by a slight extension or contraction of the mount. The rubber pads are sufficiently stiff in the vertical plane to prevent undesirable tilting of the truck frame.

In the middle of each floating bolster beam 34, there is a circular center plate 51 adapted to receive one of a pair of large diameter bearing pins or bosses on the underside of the locomotive car body. The static weight of the locomotive car body is transmitted via such pins to the centers of the respective bolster beams on the truck assemblies. This cooperating bearing pin and center plate arrangement permits each truck assembly to swivel with respect to the locomotive car body as the wheels 36 negotiate a curved section of track.

Figure 2A:
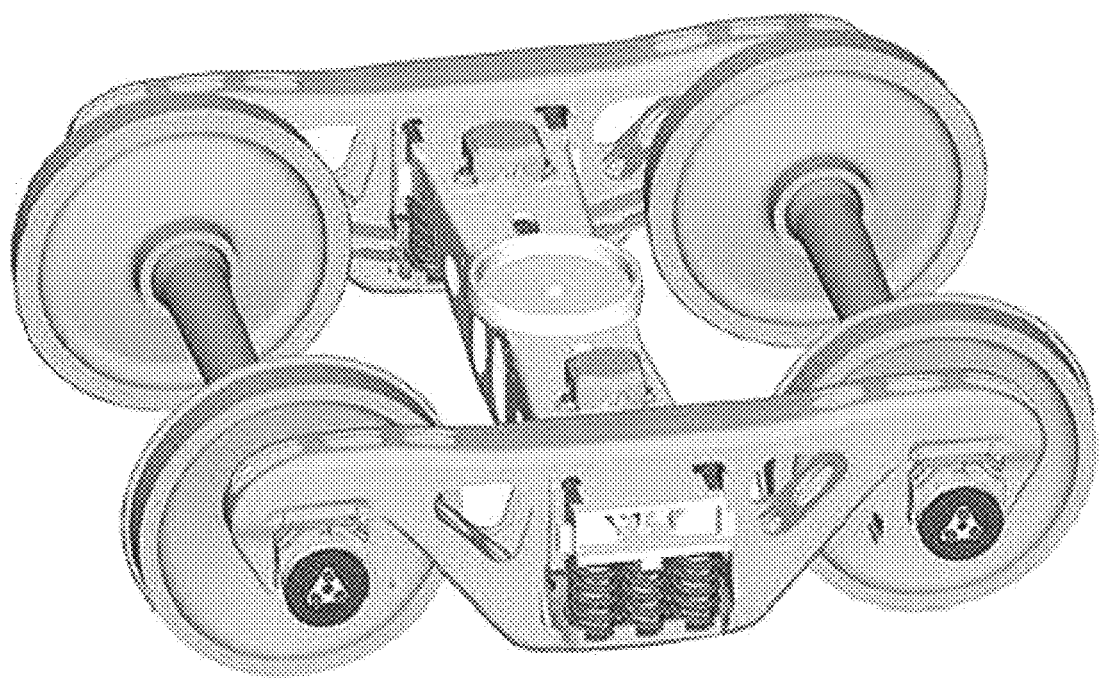
FIGS. 2a and 2b are schematics of a typical prior art freight car truck assembly.
Figure 2B:
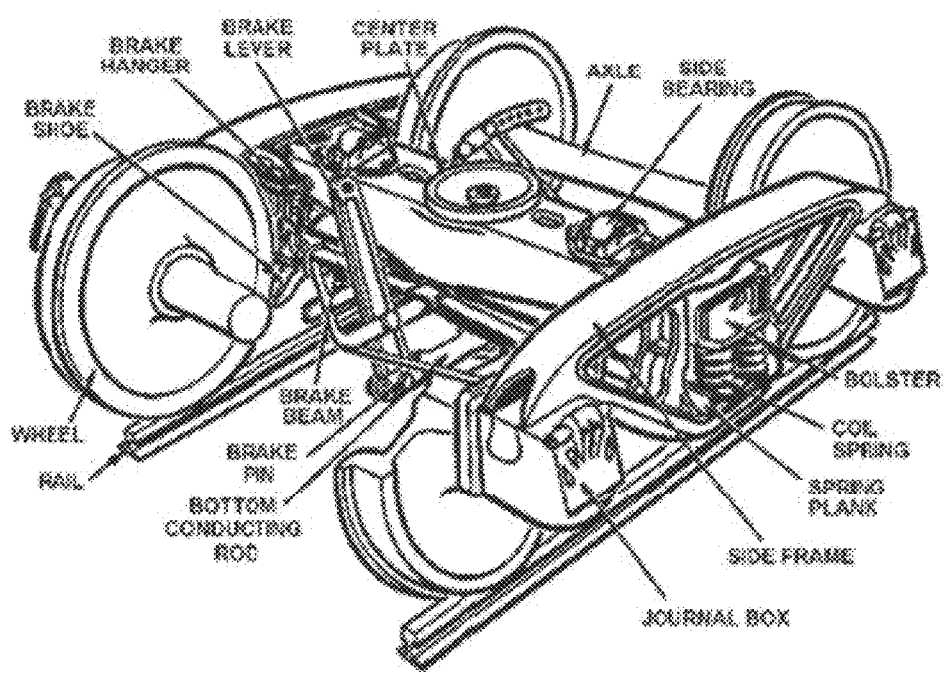

FIGS. 2a and 2b are schematics of a typical prior art two axle freight car truck assembly. FIG. 2a is an isometric view of a freight car truck assembly illustrating a truck frame connecting two wheel/axle assemblies. FIG. 2a is a more modern truck assembly using roller bearings between each axle and the truck frame. FIG. 2b is an older type truck assembly using friction or plain bearings in the journal box. These type of truck assemblies are now outlawed in North America. It is shown herein because it has all the bake rigging and miscellaneous parts labeled.

Figure 3:
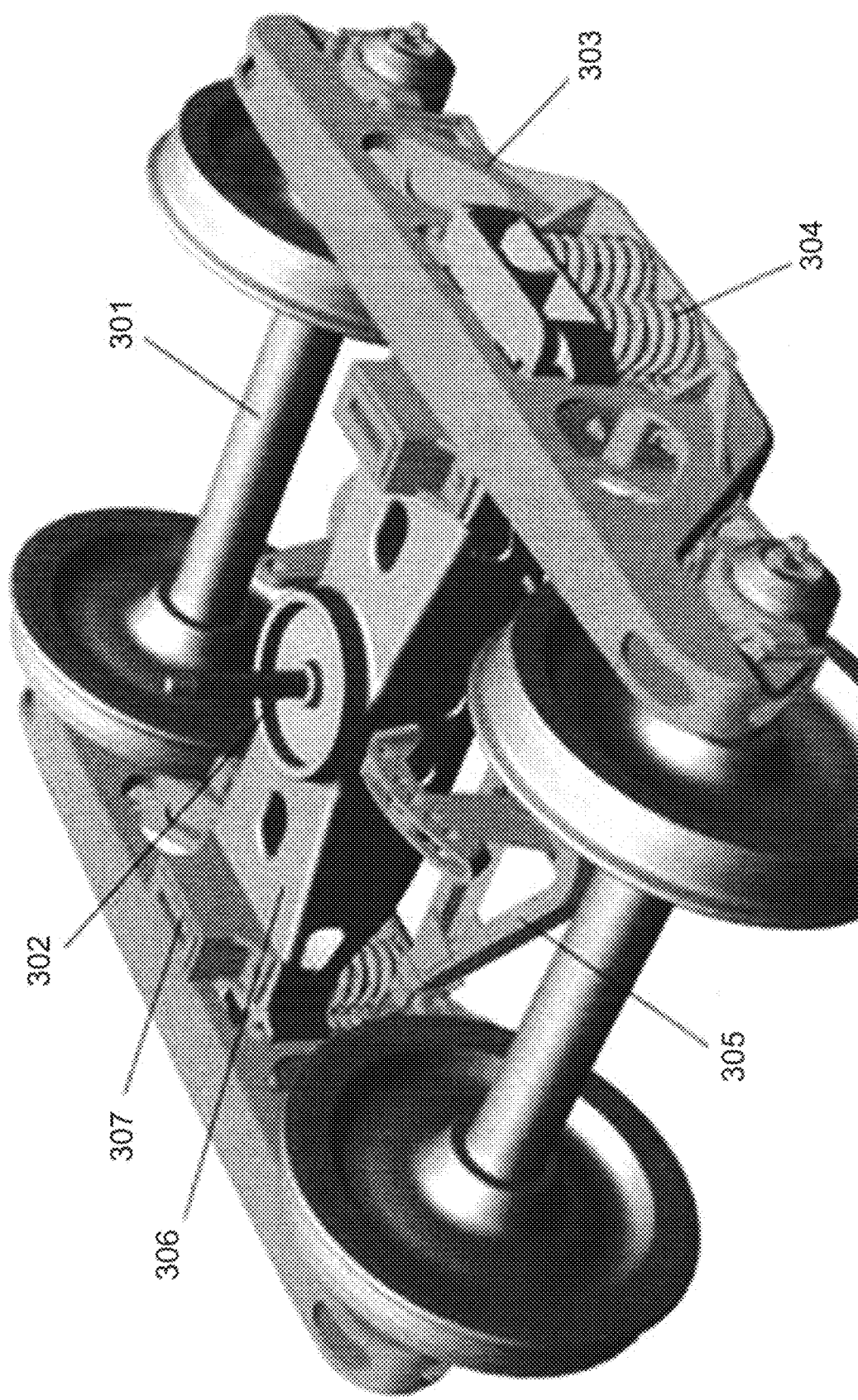
FIG. 3 is a schematic of a prior art two axle light rail truck assembly.

FIG. 3 is a schematic of another prior art freight car truck assembly. FIG. 3 shows an axle 301 of a wheel set, the center plate 302, the side frame 303, suspension springs 304, the brake beam 305, the bolster beam 306 and a side bearing 307 on which the car body contacts to prevent excessive swaying.

FIGS. 4a and 4b are schematics of a prior art axle hung nose suspended traction motor in a truck assembly. These figures are an illustration of 'nose suspended traction motor' arrangement. FIG. 4a shows a traction motor 401 and a nose receiver or nose suspension attachment 402. The nose receiver or nose suspension attachment 402 connects the truck assembly to the bolster. FIG. 4b shows a traction motor 403, its support or suspension bearings 404, bull gear 406 connected to the axle and pinion gear 407 connected to the traction motor 403.

Modified Freight Truck Configurations

In the present disclosure of a modified freight truck assembly, the challenge is taking a common mass-produced freight car truck and motorizing it with as little changes to the truck assembly itself. A locomotive style truck could be built with traction motors but at a cost of size, weight, and manufacturing cost, and that is the reason to do something different.

FIGS. 5a-5c are schematics of a motorized freight truck showing belts and gears. FIG. 5a is a detailed side view of a modified freight car truck. FIG. 5b is an isometric view of a modified freight car truck and FIG. 5c is a side view of a modified freight car truck. In FIG. 5a, a traction motor 504 is attached to a frame 503. A sprocket on the shaft of traction motor 504 drives a synchronous belt 507 which drives a sprocket on jackshaft pulley assembly 506. Pinion gear 509 is attached to the shaft of jackshaft pulley assembly 506. Pinion gear 509 drives bull gear 508 which is mounted on the axle shaft of a 38-inch diameter flanged rail car wheel and Class G axle attached to a truck frame. Bull gear 508 is attached to rail car wheel 502. Jackshaft pulley assembly 506 transmits the drive force from synchronous belt 507 to pinion gear 509 and then to the bull gear 508 which powers rail car wheel 502.

An example of synchronous belt 507 is the carbon fiber Poly Chain GT Carbon Belt Drive made by the Gates Corporation. The synchronous belt may also be made of steel chain.

Side view FIG. 5c shows the frame 521 which includes bolster 522. Frame 521 forms the main truck body on which traction motors are suspended close to both axles.

In one configuration, a traction motor is attached to a frame and a sprocket on the shaft of the traction motor drives a synchronous belt which drives a pinion sprocket on a jackshaft assembly. The pinion gear attached to the shaft of the jackshaft assembly drives a bull gear which is mounted on the axle shaft of a rail car wheel. The jackshaft sprocket transmits the drive force from the synchronous belt to the pinion gear and then to the bull gear attached to the rail car wheel.

In this embodiment of the present disclosure, a truck assembly for a rail car includes: a bolster assembly connected to side frames; two or three axles rotatably connected to the side frames, wherein at least one wheel is connected to the axle, and a space is formed between the axle and the bolster assembly; a traction motor connected to the bolster assembly and positioned in the space, wherein a shaft of the traction motor rotates about an axis that is parallel to an axis of the axles, and the shaft has a traction sprocket; a jackshaft assembly positioned outside of the space, the jackshaft assembly having a shaft with a jackshaft sprocket and a pinion gear, wherein the jackshaft sprocket has a larger diameter than the traction sprocket; a belt or chain connected to the traction sprocket and the jackshaft sprocket to transfer torque from the shaft of the traction motor to the shaft of the jackshaft assembly; and a bull gear connected to the axle and operably connected to the pinion gear. The bull gear has a larger diameter than the pinion gear whereby the pinion gear and the bull gear transfer torque from the shaft of the jackshaft assembly to the axle and the at least one wheel to propel the rail car FIGS. 6a-d are schematics of a motorized freight truck showing belts only. FIG. 6a is a detailed side view of a modified freight car truck. FIG. 6b is an isometric view of a modified freight car truck. FIG. 6c is a side view of a modified freight car truck and FIG. 6d is a close up of the teeth of a synchronous belt. In FIG. 6a, a traction motor 604 is attached to a frame 603. A sprocket on the shaft of traction motor 604 drives a primary synchronous belt 607 which drives a sprocket on jackshaft pulley assembly 606. A smaller pulley on the shaft of jackshaft pulley assembly 606 drives rail car wheel 605 via a secondary synchronous belt 602. The jackshaft pulley assembly 606 shown transmits the drive force from primary belt 607 to secondary belt 602 and then to the sprocket attached to rail car wheel 605 which powers rail car wheel 605.

Side view FIG. 6c shows the frame 621 which includes bolster 622. Frame 621 forms the main truck body on which traction motors are suspended close to both axles. FIG. 6d shows the teeth of a synchronous belt which mesh with the teeth on the sprocket on the shaft of traction motors, the sprocket on pulley 606 and the sprocket on rail car wheel 605.

In this configuration, a traction motor is attached to a frame and a sprocket on the shaft of the traction motor drives a primary synchronous belt which drives a sprocket on a jackshaft assembly. A smaller sprocket on the shaft of the jackshaft assembly drives a rail car wheel via a secondary synchronous belt. The jackshaft sprocket transmits the drive force from the primary belt to the secondary belt and then to a sprocket attached to the rail car wheel.

In this embodiment, a truck assembly for a rail car includes: a bolster assembly connected to side frames; an axle rotatably connected to the side frames, wherein at least one wheel is connected to the axle, and a space is formed between the axle and the bolster assembly; a traction motor connected to the bolster assembly and positioned in the space, wherein a shaft of the traction motor rotates about an axis that is parallel to an axis of the axles, and the shaft has a traction sprocket; a jackshaft assembly positioned outside of the space, the jackshaft assembly having a shaft with a jackshaft sprocket and a pinion gear, wherein the jackshaft sprocket has a larger diameter than the traction sprocket; a belt or chain connected to the traction sprocket and the jackshaft sprocket to transfer torque from the shaft of the traction motor to the shaft of the jackshaft assembly; a bull gear connected to the axle, wherein the bull gear has a larger diameter than the pinion gear; and a belt or chain connected to the pinion gear and the bull gear to transfer torque from the shaft of the jackshaft assembly to the axle and the at least one wheel to propel the rail car.

FIGS. 7a-c are schematics of a motorized freight truck showing belts, gears and idler. FIG. 7a is a detailed side view of a modified freight car truck. FIG. 7b is an isometric view of a modified freight car truck and FIG. 7c is a side view of a modified freight car truck. In FIG. 7a, a traction motor 704 is attached to a frame 703. A sprocket on the shaft of traction motor 704 drives a synchronous belt 707 which drives a sprocket on the shaft of jackshaft pulley assembly 706. Pinion gear 731 is attached to the shaft of jackshaft pulley assembly 706. Pinion gear 731 drives idler gear 732 which drives bull gear 708 which is mounted on the axle shaft of rail car wheel 702. Jackshaft pulley assembly 706 transmits the drive force from synchronous belt 707 to pinion gear 709 and then, via idler gear 732 to bull gear 708 which powers rail car wheel 702.

Side view FIG. 7c shows the frame 721 which includes bolster 722. Frame 721 forms the main truck body on which traction motors are suspended close to both axles.

In this configuration, a traction motor is attached to a frame and a sprocket on the shaft of the traction motor drives a synchronous belt which drives a pinion sprocket on a jackshaft pulley assembly. The pinion gear attached to the shaft of the jackshaft pulley assembly drives an idler gear which, in turn, drives a bull gear mounted on the axle shaft of a rail car wheel. The truck assembly further includes an idler gear connected to the pinion gear and the bull gear. The idler gear transfers torque from the pinion gear to the bull gear. This configuration with the intermediate idler gear permits a greater mechanical advantage than does the direct meshing of the pinion and bull gears.

Figure 8:
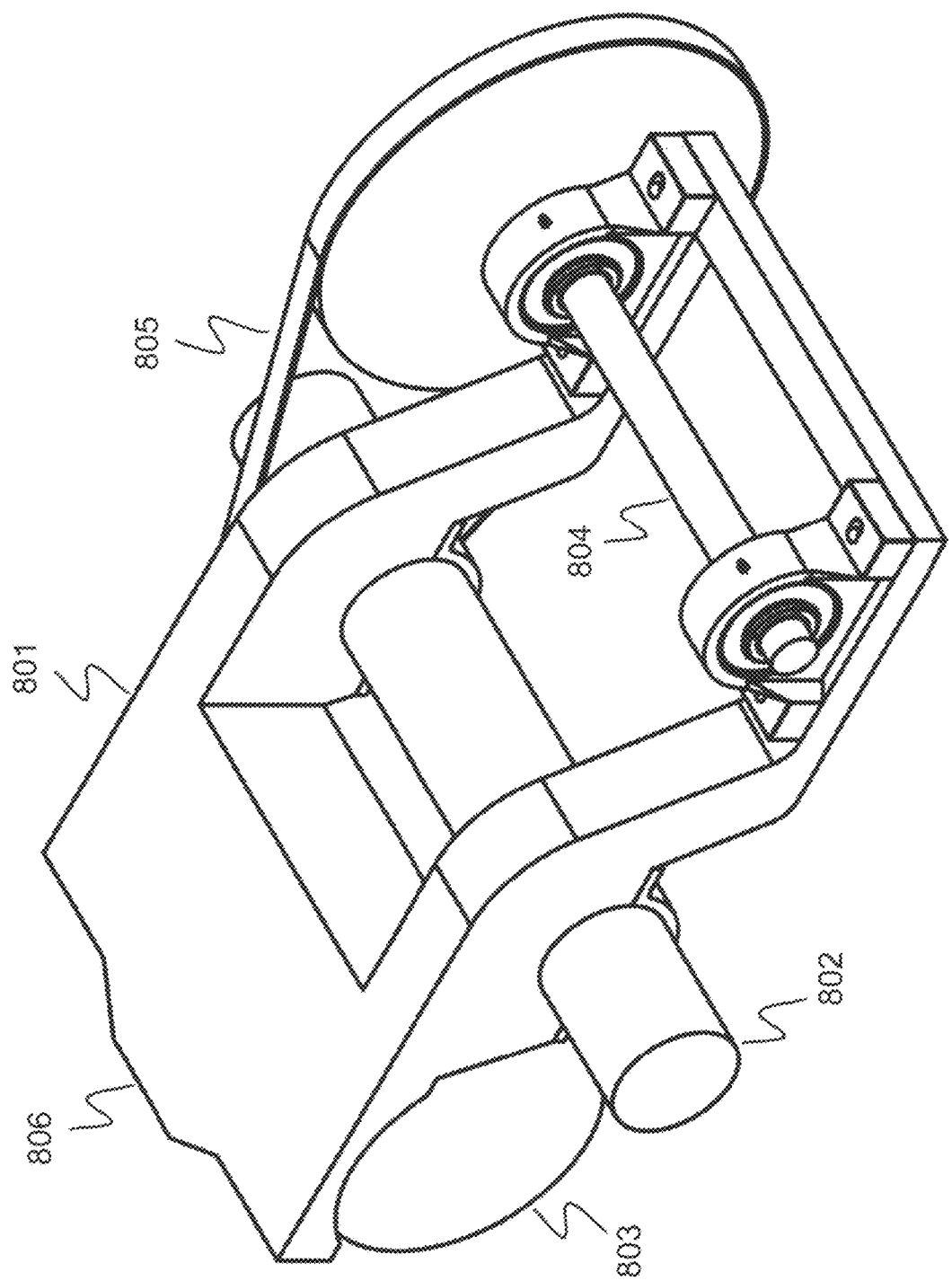
FIG. 8 is a schematic of a motorized freight car truck traction drive frame assembly.

FIG. 8 is a schematic of a motorized freight car truck traction drive frame assembly. The traction drive frame 801 is attached to the bolster assembly by a custom fixture and clamped to the wheel axle 802 of the freight car truck assembly being motorized. Traction motor 803 is attached to traction drive frame 801 preferably by bolts. Jackshaft 804 is mounted on the end platform of traction drive frame 801. Jackshaft 804 is driven by a large sprocket which connects a synchronous belt or chain 805 to the smaller output shaft of traction motor 803. The traction drive frame assembly as shown in FIG. 8 is an integrated unit combining the traction motor 803 with its transmission means comprising a belt or chain 805 and jackshaft 804. As can be appreciated, the transmission means can also be comprised of gears, belts or chains as shown in FIGS. 5-7.

A custom fixture is attached to the bolster assembly to receive the nose 806 of the traction drive frame 801. The custom fixture may be welded or bolted onto the bolster assembly. The nose 806 fits into a female receptacle of the custom fixture. Once inserted into the fixture, the traction drive frame 801 becomes firmly attached to the freight car truck when the traction drive frame 801 is clamped to the wheel axle 802. The traction drive frame 801 is secured to wheel axle 802 and includes shaft bearings at both contact points. The bolster beam and side frames are modified as needed to accommodate the traction drive frame 801.

This arrangement prevents the traction drive frame 801 from rotating with respect to the truck when the traction motor 803 is powered.

In terms of overall gear ratio from traction motors to rail car wheels, the ratio of about 10:1 to about 16:1 will result in speeds of about 60 mph with a 38" wheel and tractive effort of about 12,500 lbs per driven axle with motors that will fit within the space between the axle and bolster assembly. Typical gearing on a locomotive between the pinion and bull gear is about 4:1 and synchronous belts will operate easily at this gear ratio. Therefore achieving an overall gearing ratio of about 16:1 in two stages, is practical.

In terms of individual stages for a total gear ratio between traction motor and rail car wheel of about 10:1 to about 16:1:
Traction motor shaft to jackshaft sprocket is about 4:1
Pinion gear to bull gear is about 2:1 to about 4.3:1
Pinion gear to idler gear to bull gear is about 4:1 to about 8:1

Method of Conversion for Powered Freight Car Trucks

The following general method is contemplated:
acquire a rail freight car and remove one or both truck assemblies (or build a railcar from new or used components and acquire the rail freight trucks)
uninstall the brake rigging and remove the axle bearings
remove the wheel on one side of the axle
add a sleeve bearing onto the axle to mount the frame for the traction motor and jack shaft assembly
add a bull gear or sprocket
replace the wheel
attach the wheel to the sleeve bearing
on the frame, mount a traction motor on one side of axle
on the frame, add a jack shaft on other side of axle (the jack shaft transfers power from the output shaft of the traction motor to the drive axle of the truck)
connect the traction motor to a nose which attaches to the truck bolster
install a new braking system The innovation disclosed herein is taking a common mass-produced freight car truck and motorizing it with as little changes to the truck itself. A locomotive style truck can be built with traction motors but at a cost of size, weight, and manufacturing cost. However, using modern motor technology either a 'gearless' high specific torque traction motor arrangement or some kind of high torque traction motor but with an integral gear to develop the required torque appears possible. Therefore the novel concept is the modifying an existing freight truck to install a high torque traction motor or motors. There a few examples of gearless railway traction motors on passenger locomotives and light-rail (trams), but these applications do not require the relatively high torque and resulting tractive effort required for hauling heavy loads up steep grades (greater than about 10%).

The basic rule with electric motors is that their torque production is proportional to their rotor volume and, by the same reasoning, a motor's torque is roughly proportionally to its total volume. So with this reasoning, a simple motor design that occupies the space between axles of a rail freight truck assembly in a coaxially arrangement with wheel axle passing through the center of the motor is proposed. This design would be a gearless arrangement with the motor having only two sets of bearings.

The outer housing of this motor would have a 'nose' that would be held by a fixed part on the truck frame to keep the outer motor from rotating. If the torque production of this gearless design was inadequate for our application, a more complicated arrangement with the addition of an integral gear set can be used. An epicyclic (planetary) gear set could increase the torque of the motor by a factor of three.

So the conventual arrangement (FIG. 3) or any of the other possible ways of mounting a traction motor in a standard freight car truck and having it drive the wheels is disclosed.

To implement any of these designs, there are a number of types of motors, cooling means for the motors and controls for the motors that can be considered. Reworking the standard freight car truck will also require a different braking system to be designed.

The reason for starting with a mass-produced standard freight car truck rather than other options like a specially designed powered truck, a locomotive truck, or a powered passenger car (coach) truck is it is potentially the lowest cost option and its tare weight would be the lowest. Because mass-produced trucks are made of cast steel they can easily be modified with welded attachments which can be readily machined.

The brake rigging (brake beam) on a mass-produced standard freight car truck takes up too much space in the space within the truck and would limit the mounting options for traction motors. The brake rigging or brake beam can interfere occupy space within the truck that can be used by a traction motor. Therefore the brake system needs to be modified.

There are at least four options to consider for powering the wheels within a standard freight car truck.

1. Use the volume between the wheels and have a custom coaxial traction motor manufactured to occupy this volume. This motor would have a 'nose' and would require a fixture attached to the bolster the clasp the motor to the bolster. This motor could deliver the required torque to the axle for providing adequate tractive effort without gearing. Application requiring greater torque on the axle could employ an integral epicyclic gear (also called a planetary gear).

2. Mount a traction motor that would be 'axle hung and nose suspended'. This arrangement is typically found on all freight locomotives with traction motors. To mechanically connect the traction motor shaft to the wheel axle, a simple pinion and bull gear arrangement can be used with the smaller pinion gear connected to the motor shaft and the larger bull gear mounted on the wheel axle. Because of space limitations between the wheel axle and truck bolster the traction motors could be mounted on the outside of the truck using a cantilever arrangement. In this arrangement, the traction motor can be attached to a beam that would rest on a bearing riding on the wheel axle.

3. A third option, similar to option 2, would be to use a jack shaft such as shown in FIGS. 5a-5c, 6a-6d and 7a-7c. In this arrangement, the traction motor would be nested between the wheel axle and the bolster, and again it would be axle hung and nose suspended. A jack shaft would be cantilevered on the outside of the truck. This jack shaft would be driven by a belt or a chain from the traction motor on the opposite side of the wheel axle. This jack shaft would have a pinion that in turn would mesh with a bull gear mounted on the wheel axle or a second belt or chain that would drive the wheel axle from the jack shaft. This arrangement would give a significant mechanical advantage over option 1 and 2 for reducing the torque requirement of the traction motor.

4. A fourth option, similar to options 2 and 3, would have a single reduction similar to option 2 but would have a second traction motor with a pinion gear that would cantilever on the outside of the truck.

Because of the electrical and mechanical losses within the traction motor, cooling schemes for the traction motors must be considered. There is a possibility than in some applications, the motors can be self-cooled by internal fans. Forced air, such as used for cooling in all locomotive traction motors, may be another method used.

Yet another cooling technique used in high power density motors is liquid cooling. Using a liquid to transfer the heat from the motor to a heat exchanger and then the environment might be a way of keeping the motors free of contamination for long life especially under conditions like mining.

In addition to a standard freight car with its truck assemblies modified to include one of more traction motors, the freight car can be further modified to be configured as a road-rail vehicle that is capable of operating on railroad tracks or on regular roads. The road-rail vehicle has rubber tires for operating on regular roads. Pilot wheels comprising rail wheels can be lowered on to rails when operating on railroad tracks. In this latter mode, the rubber tires still contact the rails and the pilot wheels guide the vehicle along the tracks. Propulsion is typically through the conventional tires, the flanged wheels being free-rolling. The flanged rail wheels are raised and lowered as needed.

In addition to a standard freight car with its truck assemblies modified to include one or more traction motors, the freight car can be further modified for semi-autonomous or fully autonomous operation such as the dock-side container mover and the rail mine haul dumper illustrated in FIGS. 8 and 9a-b. Operation can be carried out remotely and may independently operable by an operator: on foot; in a separate vehicle; or in a building or in any other remote location in communication with the self-powered burden car. The self-powered burden car may utilize any number of remote control techniques, such as for example, a belt controller unit worn by the operator, a radio telemetry unit, a wireless unit such as a computer or cellular phone, an optical link or any other commonly known means of communication.

Further, self-powered burden car may be operable in a zero emission mode whether on rails or on a road. When on rails, the self-powered burden car may be powered by its on-board engine or by an external source such as a third rail or catenary or by an on-board battery pack or fuel cell. The battery pack or fuel cell may be charged when the burden car is on the rails and under way covering distances of tens, hundreds or even thousands of miles. For its last mile or few miles, the burden car may run on a paved road pavement powered by its battery or fuel cell in its zero emissions mode.

When traveling on rails and powered by a catenary, the burden car can use one of the rails as a return connection in contrast to haul trucks being powered from two overhead wires.

Using rails with grade separation for this autonomous controlled burden car greatly reduces complexity of the control and is safer, more energy efficient and would have lower operating costs. It is well-known that the cost of rail upkeep per million ton mile is much less than haul trucks on roads, highways, or interstate routes.

Road-Rail Container Mover Application

A road-rail vehicle is a vehicle capable of operating on railroad tracks or on regular roads. The road-rail vehicle has rubber tires for operating on regular roads. Pilot wheels comprising rail wheels can be lowered on to rails when operating on railroad tracks. The rubber tires still contact the rails and the pilot wheels guide the vehicle along the tracks. Only the rubber tired wheels are powered.

FIGS. 9a-b are isometrics views of a low emissions road-rail dock-side container mover. FIG. 9a is an isometric view of the container mover and FIG. 9b is a close-up view of a wheel assembly which in turn is comprised of rubber tired wheels and steel rail guide wheels. The road-rail vehicle is comprised of body 910, power electronics 904 and pantograph 903. Pantograph 904 connects a single wire catenary 902 to the power electronics 904. Power electronics 904 drive traction motors on one or more driver axles. The traction motors are grounded through connections to the rail wheels 912 which, in turn, connect to rails 910. A freight container 901 is set on body 910 and is removable by crane. As can be seen, the container mover is powered by the rubber tires on the rail tracks. The pilot rail wheels keep the container mover on the tracks and can be retracted when not needed while on a road or other non-rail surface. The under carriage storage areas 905 may contain energy storage battery packs or be used for tool storage etcetera. Storage areas 905 may be replaced by belly fuel tanks or natural gas storage tanks. The catenary system may be replaced or augmented by an engine or engines mounted on the end of the body 910. The engines may be low emissions diesel or microturbine engines.

A typical container mover route might be from dockside to a heavy rail terminus several miles away and may involve both road and rail surfaces as well as grades of 10% or more. The container mover is loaded at dock side while on a hard surface with the rail guide wheels retracted. The container mover then operating on catenary, third rail or energy storage batteries leaves the dockside and proceeds by road or light rail tracks to an area away from the docks. The container mover then proceeds to the rail head via road or light rail by operating on a catenary, a third rail or by its own on-board Tier 4 engines. Once at the heavy rail terminus, the freight container is off-loaded to a train. The container mover then returns to dock-side either without a container, carrying an empty freight container or carrying another loaded freight container. At any section along the route, the energy storage battery packs may be recharged from the catenary, third rail or on-board engines.

Road-Rail Mine Hauler Application

FIG. 10 is an isometric view of a low emissions road-rail mine hauler vehicle. The mine hauler includes a wheel assembly comprised of rubber tired wheels and steel rail guide wheels. The mine hauler vehicle is comprised of body 1010, power electronics 1004 and pantograph 1003. Pantograph 1004 connects a single wire catenary 1002 to the power electronics 1004. Power electronics 1004 drive traction motors on one or more driver axles. The traction motors are grounded through connections to the rail wheels 1012 which, in turn, connect to rails 1010. An ore container box 1001 is attached to body 1010. The ore or waste container box can be side-dumped by hydraulic pistons (not shown) located under the container box. As can be seen, the mine hauler is powered by the rubber tires on the rail tracks. The pilot rail wheels keep the mine hauler on the tracks and can be retracted when not needed while on a road or other non-rail surface. The under carriage storage areas 1005 may contain energy storage battery packs or be used for tool storage etcetera. Storage areas 1005 may be replaced by belly fuel tanks or natural gas storage tanks. The catenary system may be replaced or augmented by an engine or engines mounted on the end of the body 1010. The engines may be low emissions diesel or microturbine engines.

A mine hauler route might be from the advancing ore face in an open pit mine to an ore processing plant several miles away and may involve both road and rail surfaces as well as grades of 10% or more. The mine hauler is loaded near the mine face while on a mine road with the rail guide wheels retracted or on specially laid panel tracks. As is well-known, panel tracks can be quickly extended as the mine face advances. The mine hauler then operating on catenary, third rail, energy storage batteries or its own low emission engines leaves the mine face and proceeds by road or light rail tracks out of the mine. The mine hauler then proceeds to the ore processing plant or waste dump area via road, panel track or existing heavy rail line by operating on a catenary, a third rail or by its own on-board Tier 4 engines. Once at the ore processing plant or waste dump area, the mine hauler car dumps it load in a designated area. The mine hauler then returns to mine either empty or carrying supplies. At any section along the route, the energy storage battery packs may be recharged from the catenary, third rail or on-board engines.

Panel Track

The present disclosure also uses a combination of permanent track sections and sections of track formed by panel track which can be laid down quickly and reconfigured as needed. This capability is an advantage for example when a terminus served by the system is constantly changing, such as, for example, an advancing mine face. Panel tracks are discussed in U.S. Pat. No. 8,428,796 entitled "Rail Conveyance System for Mining"

Figure 11:
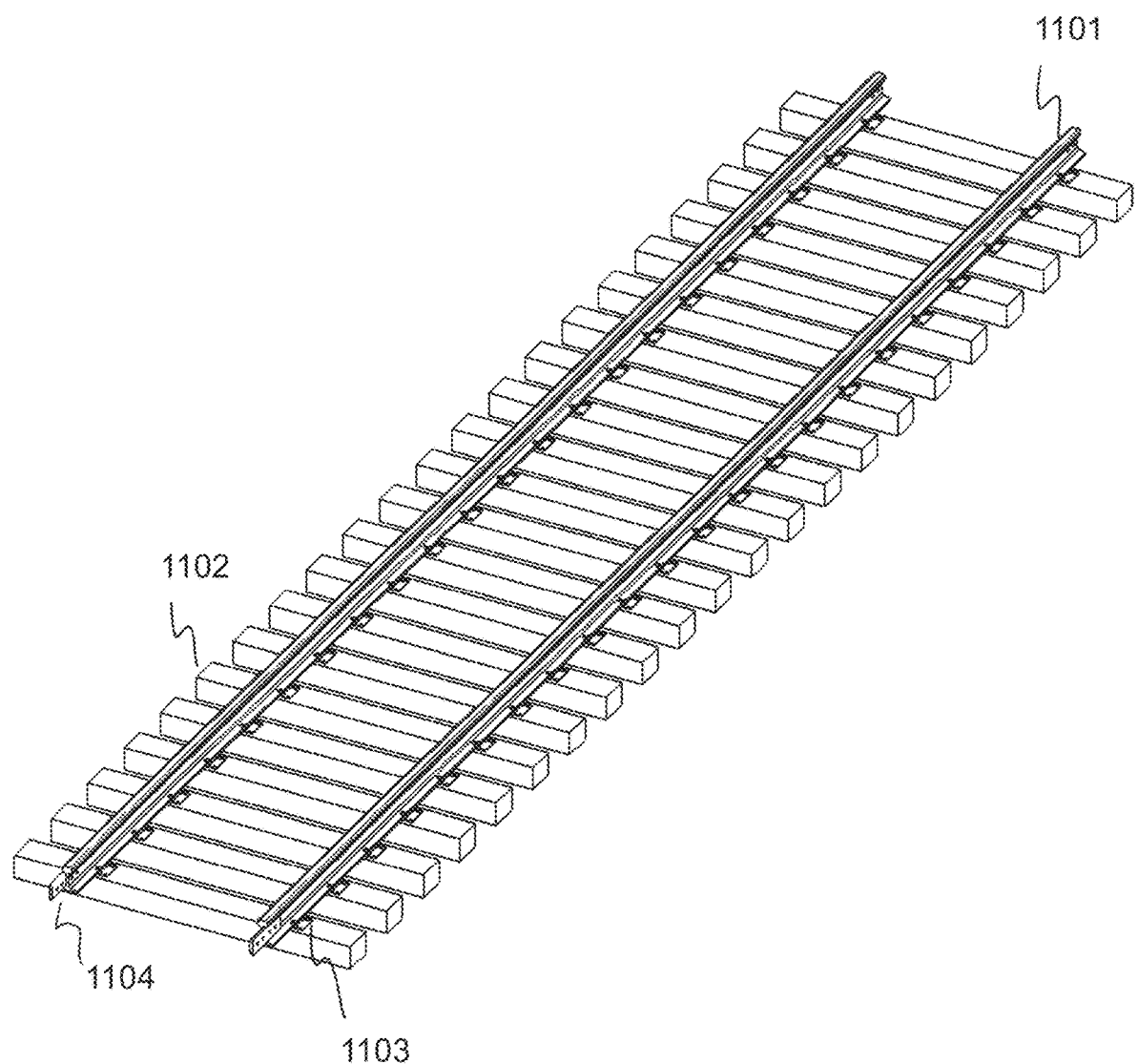
FIG. 11 is an isometric schematic view of a section of panel track which is prior art.

FIG. 11 is an isometric schematic view of a section of panel track which is prior art. This is a section of pre-fabricated track comprised of rails 1101, ties 1102 and tie-down spikes 1103. The ends of each rail 1101 have splicing bars 1104 that allow track panels to be assembled into a track of any length. As can be appreciated, the sections of panel track may be curved either as right or left handed sections. As can be further appreciated, a track system for a any transport operation can be constructed using well-known track laying techniques. However, panel track (pre-fabricated sections of track) is preferable for many applications of the present invention as it allows more flexibility for laying and re-routing track quickly. Such panel track may be maneuvered into position by, for example self-powered cranes, backhoes, front end loaders and the like. Panel track can be installed on a standard road bed of gravel or a flat graded surface. Alternately, panel track can easily be installed on road beds comprised of plywood laid on a gravel bed which may be preferable for areas of poor ground. This latter option may be used since the cars of the present invention travel individually thus not placing a load along a length of track longer than a single car. Panel track is most suited to many mining applications since the mine layout is always changing as the working face or faces are advanced. Permanent track layouts may be preferable for applications in, for example, ports where cargo is moved repetitively from known locations to other known locations.

Figure 12:
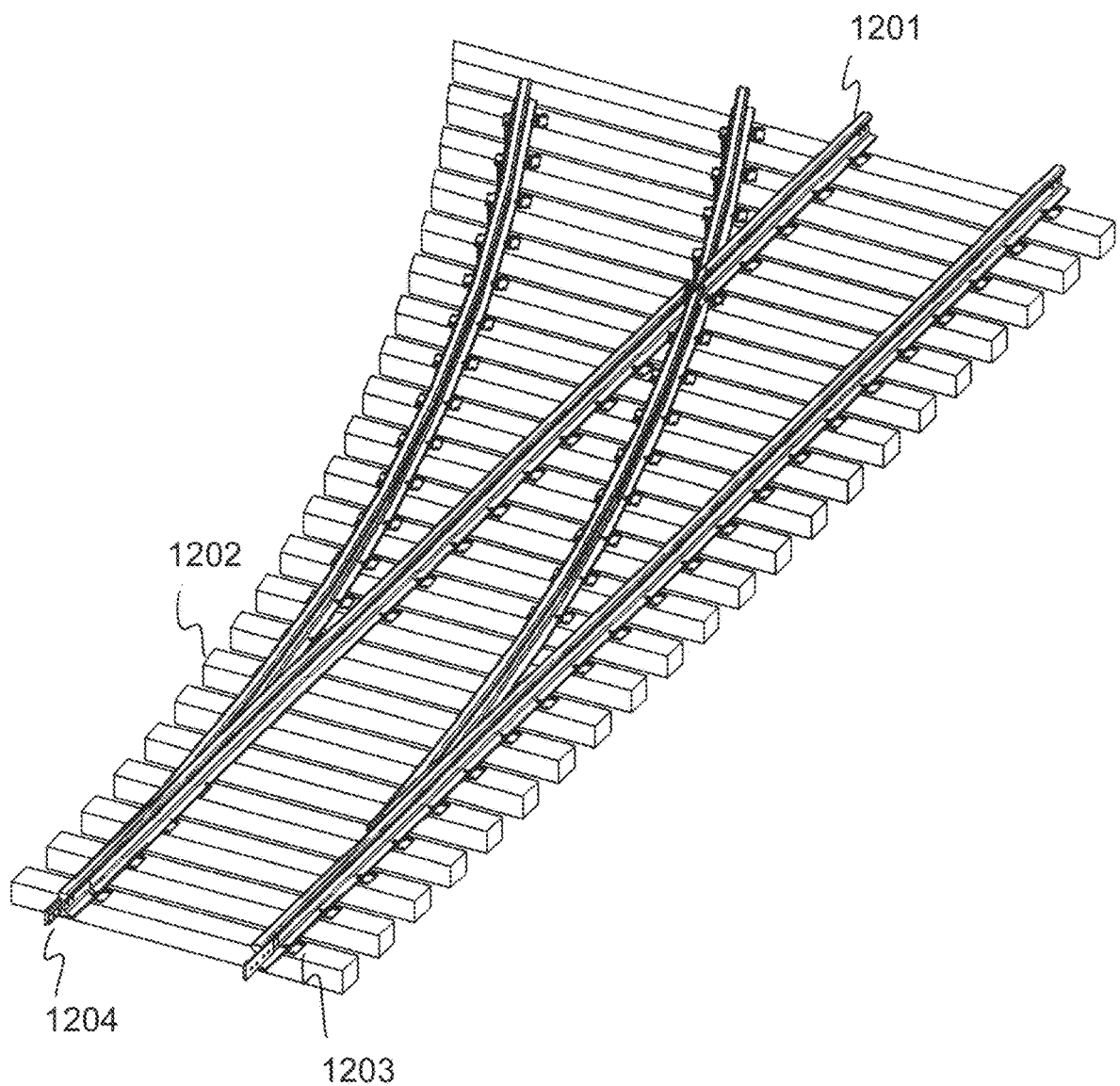
FIG. 12 is an isometric schematic view of a section of switched panel track which is prior art.

FIG. 12 is an isometric schematic view of a section of switched panel track which is prior art. This is a section of pre-fabricated track comprised of rails 1201, ties 1202 and tie-down spikes 1203. The ends of each rail 1201 have splicing bars 1204 that allow track panels to be assembled into a track layouts of any configuration and length. Panel track typically has the joints at the end of each section directly opposite each other. It is sometimes preferable to not have joints directly opposite each other. If desired, panel track sections can be fabricated with one rail shorter on both ends such that a separate short section can be installed to keep the rail joints from being located directly opposite each other. The articulated switch can be manually but preferably operated remotely by the system operator.

Rail Only Configuration

Figure 13:
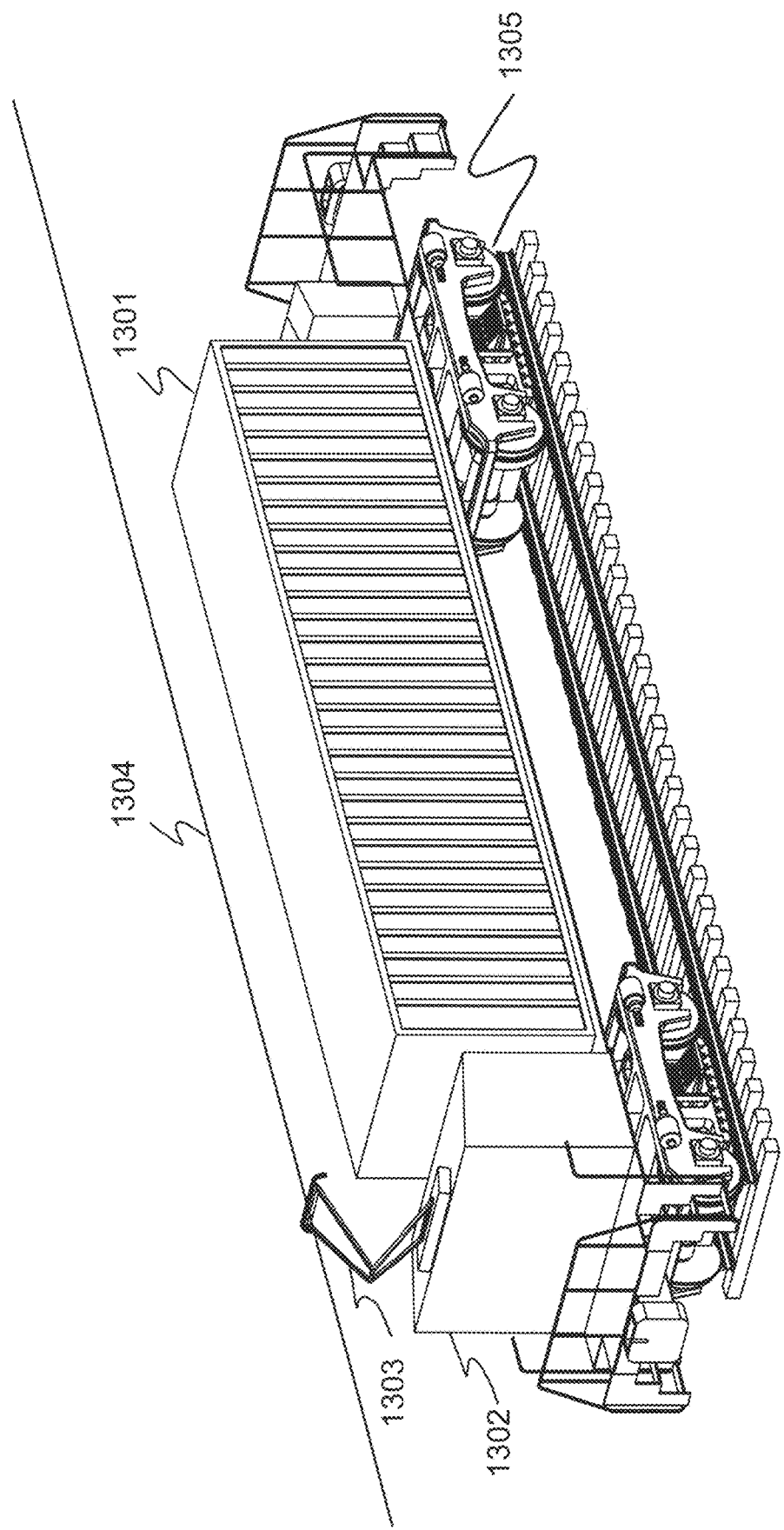
FIG. 13 is a prior art isometric schematic view of a self-powered automated cargo container car.

FIG. 13 is a prior art isometric schematic view of a self-powered automated cargo container car taken from U.S. Pat. No. 8,428,796. This car is similar to that of FIG. 9 except that the road-rail truck assembly has been replaced by a modified freight car truck assembly of the present disclosure which includes conventional 38 inch diameter flanged rail wheels.

A number of variations and modifications of the disclosures can be used. As will be appreciated, it would be possible to provide for some features of the disclosures without providing others.

The present disclosure, in various embodiments, includes components, methods, processes, systems and/or apparatus substantially as depicted and described herein, including various embodiments, sub-combinations, and subsets thereof. Those of skill in the art will understand how to make and use the present disclosure after understanding the present disclosure. The present disclosure, in various embodiments, includes providing devices and processes in the absence of items not depicted and/or described herein or in various embodiments hereof, including in the absence of such items as may have been used in previous devices or processes, for example for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the disclosure.

Moreover though the description of the disclosure has included description of one or more embodiments and certain variations and modifications, other variations and modifications are within the scope of the disclosure, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A truck assembly for a rail car, comprising:
a bolster assembly connected to at least one side frame;
at least one axle rotatably connected to the at least one side frame, wherein at least one wheel is connected to the at least one axle, and a space is formed between the at least one axle and the bolster assembly;
at least one traction motor connected to the bolster assembly and positioned in the space, wherein a shaft of the at least one traction motor rotates about an axis that is parallel to an axis of the at least one axle, and the shaft of the at least one traction motor has a traction sprocket;
a jackshaft assembly positioned outside of the space, the jackshaft assembly having a shaft with a jackshaft sprocket and a pinion gear, wherein the jackshaft sprocket has a larger diameter than the traction sprocket;
a synchronous belt or chain connected to the traction sprocket and the jackshaft sprocket to transfer torque from the shaft of the at least one traction motor to the shaft of the jackshaft assembly; and
a bull gear connected to the at least one axle and operably connected to the pinion gear, wherein the bull gear has a larger diameter than the pinion gear, and the pinion gear and the bull gear transfer torque from the shaft of the jackshaft assembly to the at least one axle and the at least one wheel to propel the rail car; and
an idler gear connected to the pinion gear and the bull gear, wherein the idler gear transfers torque from the pinion gear to the bull gear.

2. The truck assembly of claim 1, wherein a gear ratio between the pinion gear and the idler gear is at least 2:1.

3. The truck assembly of claim 1, wherein a gear ratio between the idler gear and the bull gear is at least 2:1.

4. The truck assembly of claim 1, wherein a gear ratio between the pinion gear and the bull gear is at least 4:1.

5. The truck assembly of claim 1, wherein the bolster assembly is spring-biased in one direction relative to the at least one side frame.

6. The truck assembly of claim 1, wherein the synchronous belt or chain forms a continuous loop, and the at least one axle extends through the continuous loop.

7. The truck assembly of claim 1, wherein the axis of the at least one axle, the axis of the shaft of the at least one traction motor, and an axis of the shaft of the jackshaft assembly are arranged in a common plane.

8. The truck assembly of claim 7, wherein the axis of the at least one axle, the axis of the shaft of the at least one traction motor, and an axis of the shaft of the jackshaft assembly are arranged in a common plane.

9. The truck assembly of claim 7, wherein a material of the first synchronous belt or chain is one of a carbon fiber or a steel.

10. A truck assembly for a rail car, comprising:
a bolster assembly connected to at least one side frame;
at least one axle rotatably connected to the at least one side frame, wherein at least one wheel is connected to the at least one axle, and a space is formed between the at least one axle and the bolster assembly;
at least one traction motor connected to the bolster assembly and positioned in the space, wherein a shaft of the at least one traction motor rotates about an axis that is parallel to an axis of the at least one axle, and the shaft of the at least one traction motor has a traction sprocket;
a jackshaft assembly positioned outside of the space, the jackshaft assembly having a shaft with a jackshaft sprocket and a pinion sprocket, wherein the jackshaft sprocket has a larger diameter than the traction sprocket;
a first synchronous belt or chain connected to the traction sprocket and the jackshaft sprocket to transfer torque from the shaft of the traction motor to the shaft of the jackshaft assembly;
a bull sprocket connected to the at least one axle, wherein the bull sprocket has a larger diameter than the pinion sprocket;
a second synchronous belt or chain connected to the pinion sprocket and the bull sprocket to transfer torque from the shaft of the jackshaft assembly to the at least one axle and the at least one wheel to propel the rail car; and
an idler gear connected to the pinion gear and the bull gear, wherein the idler gear transfers torque from the pinion gear to the bull gear.

11. The truck assembly of claim 10, wherein the first synchronous belt or chain forms a continuous loop, and the at least one axle extends through the continuous loop.

12. The truck assembly of claim 10, wherein the second synchronous belt or chain forms a continuous loop, and the at least one axle extends through the continuous loop.

13. A method of retrofitting a truck assembly of a rail car with at least one traction motor, comprising:
providing the truck assembly having a bolster assembly connected to at least one side frame and at least one axle connected to the at least one side frame, wherein at least one wheel is positioned at an end of the at least one axle, and wherein a space is defined between the bolster assembly and the at least one axle, and a brake rigging is connected to the bolster assembly and positioned in the space;
removing the brake rigging from the bolster assembly and the space;
connecting the at least one traction motor to the bolster assembly and positioning the at least one traction motor in the space; positioning a jackshaft assembly outside of the space on an opposing side of the at least one axle from the at least one traction motor;
transferring torque from a shaft of the at least one tractor motor to a shaft of the jackshaft assembly;
transferring torque from the shaft of the jackshaft assembly to the at least one axle to propel the rail car;
removing the at least one wheel from the at least one axle;
positioning a bull gear on the at least one axle and positioning a pinion gear on the shaft of the jackshaft assembly;
connecting the at least one wheel to the at least one axle, wherein the pinion gear and the bull gear transfer torque from the shaft of the jackshaft to the at least one axle; and
connecting an idler gear to the bull gear and the pinion gear, wherein the idler gear transfers torque from the pinion gear to the bull gear.

14. The method of claim 13, wherein a gear ratio between the pinion gear and the bull gear is at least 4:1.

15. The method of claim 13, further comprising:
providing a traction sprocket on the shaft of the at least one traction motor and providing a jackshaft sprocket on the shaft of the jackshaft assembly;
positioning a synchronous belt or chain around the traction sprocket and the jackshaft sprocket to transfer torque from the shaft of the at least one tractor motor to the shaft of the jackshaft assembly.

16. The method of claim 15, further comprising:
removing the at least one wheel from the at least one axle;
positioning a second synchronous belt or chain around the bull gear sprocket and the pinion gear sprocket; and connecting the at least one wheel to the at least one axle, wherein the second synchronous belt or chain transfers torque from the shaft of the jackshaft assembly to the at least one axle.

17. The method of claim 15, wherein the synchronous belt or chain forms a continuous loop, and the at least one axle extends through the continuous loop.

18. The method of claim 13, further comprising:
connecting a new brake system to at least one of the bolster assembly and the at least one side frame, wherein the new brake system is operably connected to the at least one axle to slow or stop rotation of the at least one axle.

\* \* \* \* \*